US009497694B2

(12) United States Patent
Kudou

(10) Patent No.: US 9,497,694 B2
(45) Date of Patent: Nov. 15, 2016

(54) WIRELESS COMMUNICATION DEVICE, WIRELESS COMMUNICATION SYSTEM AND WIRELESS COMMUNICATION METHOD

(71) Applicant: NEC Corporation, Tokyo (JP)

(72) Inventor: Masato Kudou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

(21) Appl. No.: 14/389,210

(22) PCT Filed: Nov. 29, 2012

(86) PCT No.: PCT/JP2012/007680
§ 371 (c)(1),
(2) Date: Sep. 29, 2014

(87) PCT Pub. No.: WO2013/145053
PCT Pub. Date: Oct. 3, 2013

(65) Prior Publication Data
US 2015/0092598 A1    Apr. 2, 2015

(30) Foreign Application Priority Data
Mar. 29, 2012   (JP) ................................ 2012-077786

(51) Int. Cl.
*H04W 48/16* (2009.01)
*H04W 84/18* (2009.01)
(Continued)

(52) U.S. Cl.
CPC ............. *H04W 48/16* (2013.01); *H04W 24/02* (2013.01); *H04W 84/18* (2013.01); *H04W 40/32* (2013.01); *H04W 48/18* (2013.01); *H04W 88/04* (2013.01); *H04W 88/06* (2013.01)

(58) Field of Classification Search
None
See application file for complete search history.

(56) References Cited

U.S. PATENT DOCUMENTS

| 7,353,040 B2 * | 4/2008 | Baker | .................. H04L 1/0025 |
| | | | 455/115.1 |
| 8,045,665 B2 | 10/2011 | Kwon et al. | |

(Continued)

FOREIGN PATENT DOCUMENTS

| JP | 2006-500882 | 1/2006 |
| JP | 2009-049544 | 3/2009 |

(Continued)

OTHER PUBLICATIONS

Extended European search report, dated Oct. 27, 2015; Application No. 12872617.1.

(Continued)

*Primary Examiner* — Eunsook Choi
(74) *Attorney, Agent, or Firm* — Young & Thompson

(57) ABSTRACT

A wireless communication device includes two wireless communication units, each switching one of a VHF band and a UHF band to another to conduct wireless communication; a determination unit which determines whether or not it is necessary to change a frequency band when one of the wireless communication units uses the VHF band to conduct the wireless communication, and further determines whether or not there is a wireless communication device that becomes unable to conduct wireless communication due to using the UHF band when the change is necessary; and a communication control unit which performs control to switch the band to the UHF band when it is determined that there is no wireless communication device which becomes unable to conduct wireless communication, and to leave the band as the VHF band when it is determined that there is a wireless communication device which becomes unable to conduct wireless communication.

20 Claims, 14 Drawing Sheets

(51) Int. Cl.
*H04W 24/02* (2009.01)
*H04W 40/32* (2009.01)
*H04W 88/06* (2009.01)
*H04W 88/04* (2009.01)
*H04W 48/18* (2009.01)

(56) References Cited

U.S. PATENT DOCUMENTS

| | | | |
|---|---|---|---|
| 8,059,775 B2 | 11/2011 | Kwon et al. | |
| 8,472,343 B2 | 6/2013 | Johnsson et al. | |
| 8,761,775 B1* | 6/2014 | Khanka | H04W 36/18 455/226.1 |
| 9,002,397 B2* | 4/2015 | Zhou | H04W 52/146 455/440 |
| 2008/0070586 A1* | 3/2008 | Kermoal | H04L 5/003 455/452.2 |
| 2009/0031365 A1 | 1/2009 | Kwon et al. | |
| 2009/0046591 A1 | 2/2009 | Krishnaswamy et al. | |
| 2009/0196200 A1 | 8/2009 | Moritomo | |
| 2010/0246481 A1* | 9/2010 | Aggarwal | H04L 1/0002 370/328 |
| 2010/0302994 A1 | 12/2010 | Tachtatzis et al. | |
| 2010/0309817 A1 | 12/2010 | Johnsson et al. | |
| 2011/0124333 A1* | 5/2011 | Lotze | H04W 16/14 455/434 |

FOREIGN PATENT DOCUMENTS

| | | |
|---|---|---|
| JP | 2009-182697 | 8/2009 |
| JP | 2009-188680 | 8/2009 |
| JP | 2009-540425 | 11/2009 |
| JP | 2010-004222 | 1/2010 |
| JP | 2010-537565 | 12/2010 |
| JP | 2011-503922 | 1/2011 |

OTHER PUBLICATIONS

International Search Report, PCT/JP2012/007680, Jan. 29, 2013.
Sakata et al., "Mobile Ad Hoc Networks and Wireless LAN Mesh Networks"., The Institute of Electronics, Information and Communication Engineers Transactions on Communications: B vol. J89-B No. 6, pp. 811-823, 2006.
Harada, "A Study on a new wireless communications system based on cognitive radio technology", The Institute of Electronics, Information and Communication Engineers Technical Study Report, SR, Software Radio 105(36), pp. 117-124, 2005.

* cited by examiner

WIRELESS COMMUNICATION DEVICE, WIRELESS COMMUNICATION SYSTEM AND WIRELESS COMMUNICATION METHOD

TECHNICAL FIELD

The present invention relates to a wireless communication device, a wireless communication system and a wireless communication method.

BACKGROUND ART

Recently, there have been extended technologies for an ad-hoc network which is temporarily formed by mobile wireless communication devices, and in which a fixed infrastructure and centralized control mechanism are not provided (see e.g., Non-Patent Literature 1).

Patent Literature 1 discloses a wireless communication method in which communication is simultaneously conducted between transmitters within an ad-hoc network and various receivers. Patent Literature 2 discloses an ad-hoc network formed by radio repeaters which include network interfaces using a plurality of different communication methods, and can join a plurality of networks.

In other references, Non-Patent Literature 2 discloses a method of materializing wireless equipment which can dynamically change a wireless communication configuration such as a frequency, a radio modulation method or an access method according to a state of a surrounding environment. Patent Literature 3 discloses a technique for wireless equipment which effectively transmits large volumes of multimedia data over a wireless network.

CITATION LIST

Patent Literature

Patent Literature 1: Published Japanese Translation of PCT International Publication for Patent Application No. 2006-500882

Patent Literature 2: Japanese Unexamined Patent Application Publication No. 2009-49544

Patent Literature 3: Published Japanese Translation of PCT International Publication for Patent Application No. 2009-540425

Non Patent Literature

Non Patent Literature 1: Sakata et al., "Ad Hoc Networks and Wireless LAN Mesh Networks", The Institute of Electronics, Information and Communication Engineers Transactions on Communications: B Vol. J89-B No. 6, pp. 811-823, 2006

Non Patent Literature 2: Harada, "A Study on a new wireless communications system based on cognitive radio technology", The Institute of Electronics, Information and Communication Engineers Technical Study Report. SR, Software Radio 105(36), pp. 117-124, 2005

SUMMARY OF INVENTION

Technical Problem

The ad-hoc networks according to Patent Literatures 1 to 3 and Non-Patent Literatures 1 to 2 have the following problems.

In a case of using wireless communication devices for constructing an information communication system in which various types of information are shared between users by utilizing communication applications, it is convenient for the users to be able to maintain a state where a large number of wireless communication devices can join the same network and immediately communicate with a large number of different wireless communication devices. On the other hand, while a communication application in any one of the wireless communication devices joining the network transmits sent information, the amount of available communication bands which can be used by the other wireless communication devices decreases. If the number of different wireless communication devices increases and thus communication applications have greater opportunities to conduct communication, the frequency of causing congestion increases due to a shortage of the amount of available communication bands.

Furthermore, upon constructing or maintaining an ad-hoc communication network which a plurality of wireless communication devices join, there is caused communication for control data in an ad-hoc network protocol. As the number of wireless communication devices which join the ad-hoc communication network increases, communication traffic for the control data communication increases, and thus the amount of communication bands, which can be used for transmitting information of communication applications conducting communication for voice, video and data, decreases. That is, there is a problem that the increase in the number of wireless communication devices which can conduct communication has a trade-off relationship with the ensuring of the amount of communication bands for transmitting the information of communication applications, and thus it is difficult to satisfy both of them.

The present invention has been accomplished in order to solve such problems, and an exemplary object of the present invention is to provide a wireless communication device, a wireless communication system and a wireless communication method, which can ensure the amount of communication bands for information transmission without reducing the number of wireless communication devices capable of conducting communication.

Solution to Problem

A first exemplary aspect of the present invention includes a wireless communication device that holds a plurality of wireless communication units separately forming ad-hoc wireless communication networks together with different wireless communication devices, and that conducts wireless communication across the plural ad-hoc wireless communication networks. This wireless communication device includes a first wireless communication unit, a second wireless communication unit, a determination unit, and a communication control unit. The first and second wireless communication units each form an ad-hoc wireless communication network together with the different wireless communication devices to conduct wireless communication, by switching one of a first wireless communication configuration and a second wireless communication configuration that differs from the first wireless communication configuration in communication characteristics to another to be used. The determination unit determines, at least when the first or second wireless communication unit uses the first wireless communication configuration for conducting wireless communication, whether or not there is a wireless communication device that becomes unable to conduct wireless communication due to changing the first wireless communication configuration to the second wireless communication configuration, among the wireless communication device itself and the different wireless communication devices. The communication control unit performs, when the determination unit determines that there is no wireless communication device that becomes unable to conduct wireless communication and in a case where it is necessary to change the first wireless communication configuration, control to switch a wireless communication configuration of the wireless communication unit that uses the first wireless communication configuration to the second wireless communication configuration, and performs, when the determination unit determines that there is a wireless communication device that becomes unable to conduct wireless communication, control to leave the wireless communication configuration used by the wireless communication unit as the first wireless communication configuration.

A second exemplary aspect of the present invention includes a wireless communication system including the wireless communication device according to the first exemplary aspect.

A third exemplary aspect of the present invention includes a wireless communication method for a wireless communication device that holds a plurality of wireless communication means separately forming ad-hoc wireless communication networks together with different wireless communication devices, and that conducts wireless communication across the plural ad-hoc wireless communication networks. This wireless communication method includes the following steps (a), (b) and (c):

(a) determining, when any one of the wireless communication units uses a first wireless communication configuration for conducting wireless communication, whether or not there is a wireless communication device that becomes unable to conduct wireless communication due to changing the first wireless communication configuration to a second wireless communication configuration that differs from the first wireless communication configuration in communication characteristics, among the wireless communication device itself and the different wireless communication devices;

(b) performing, when it is determined that there is no wireless communication device that becomes unable to conduct wireless communication and in a case where it is necessary to change the first wireless communication configuration, control to switch a wireless communication configuration of the wireless communication unit that uses the first wireless communication configuration to the second wireless communication configuration; and (c) performing, when it is determined that there is a wireless communication device that becomes unable to conduct wireless communication, control to leave the wireless communication configuration of the wireless communication unit that uses the first wireless communication configuration as the first wireless communication configuration.

Advantageous Effects of Invention

According to each of the above-described exemplary aspects of the present invention, it is possible to provide a wireless communication device, a wireless communication system and a wireless communication method, which can ensure the amount of communication bands for information transmission without reducing the number of wireless communication devices capable of conducting communication.

DESCRIPTION OF EMBODIMENTS

First Exemplary Embodiment

Hereafter, a first exemplary embodiment of the present invention will be described with reference to the accompany drawings.

Figure 1:
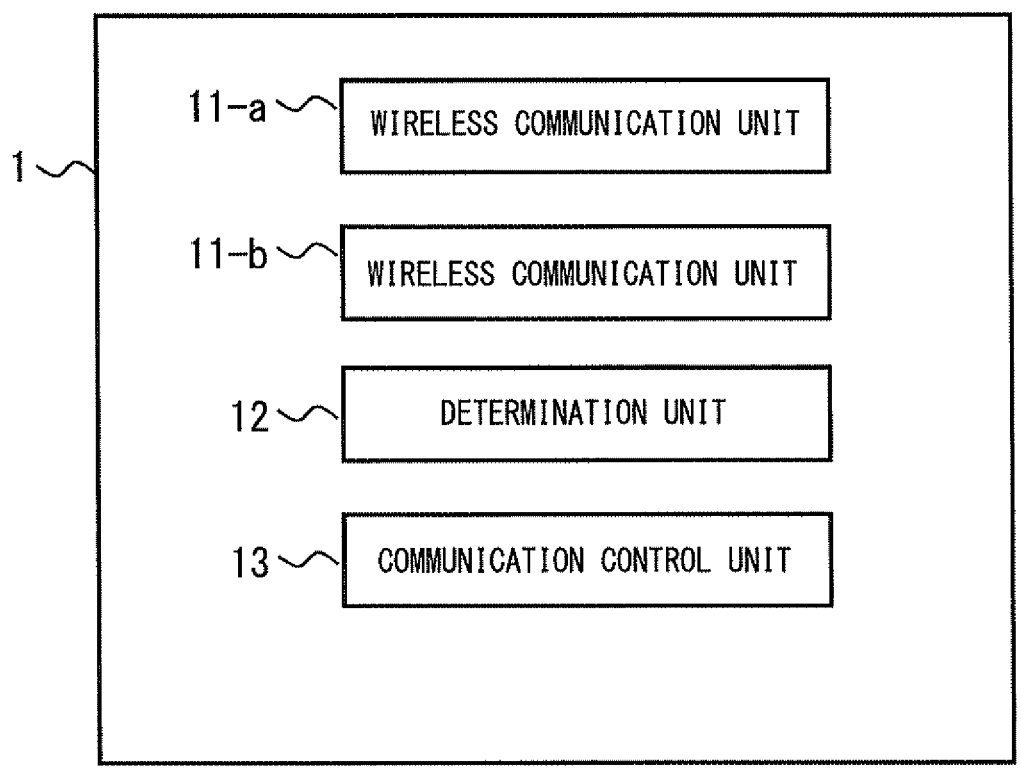
FIG. 1 is a block diagram showing a configuration example of a wireless communication device according to a first exemplary embodiment.

FIG. 1 is a block diagram showing a configuration example of a wireless communication device according to the first exemplary embodiment. A communication device 1 includes two wireless communication units 11 (wireless communication units 11-$a$ and 11-$b$), a determination unit 12, and a communication control unit 13. The communication device 11 conducts ad-hoc wireless communication with other wireless communication devices. For example, in a case where there are three wireless communication devices 1-*a*, 1-*b* and 1-*c*, the wireless communication device 1-*a* may conduct wireless communication by transmitting signals directly to the wireless communication device 1-*c*, or may transmit the signals to the wireless communication device 1-*c* through the wireless communication device 1-*b*. The wireless communication devices get together under the environment where it is desired to construct a network even without providing a fixed network, so that a network between the wireless communication devices (hereinafter be described as an ad-hoc communication network) can be constructed. Note that each wireless communication device may perform routing upon conducting communication within the ad-hoc communication network. Moreover, each wireless communication device, or one or some of the wireless communication devices in the environment may perform routing upon conducting communication toward the outside of the ad-hoc communication network. Such one or some of the wireless communication devices serves as a so-called gateway.

The wireless communication device 1 is e.g., a transceiver, a handheld terminal or a personal computer, which conducts wireless communication. Information wirelessly communicated is e.g., data information such as voice information, video information, textual information and Web. Examples of the wireless communication conducted by the wireless communication device 1 include typical mobile communication, and communication by a wireless LAN (Local Area Network).

The wireless communication unit 11-*a* switches one of a first wireless communication configuration and a second wireless communication configuration which differs from the first wireless communication configuration in communication characteristics to another to be used for the wireless communication. By this wireless communication unit 11-*a*, the wireless communication device 1 forms the ad-hoc communication network together with a different wireless communication device other than the wireless communication device 1 for conducting the wireless communication. Note that the number of wireless communication configurations which can be used by switching from one to another may not be limited to two, may instead be three or more.

The wireless communication unit 11-*b* also switches one of the first wireless communication configuration and the second wireless communication configuration to another to be used for the wireless communication. Since the wireless communication units 11-*a* and 11-*b* separately form ad-hoc communication networks together with other wireless communication devices, the wireless communication device 1 can conduct wireless communication across a plurality of ad-hoc communication networks.

Figure 2:
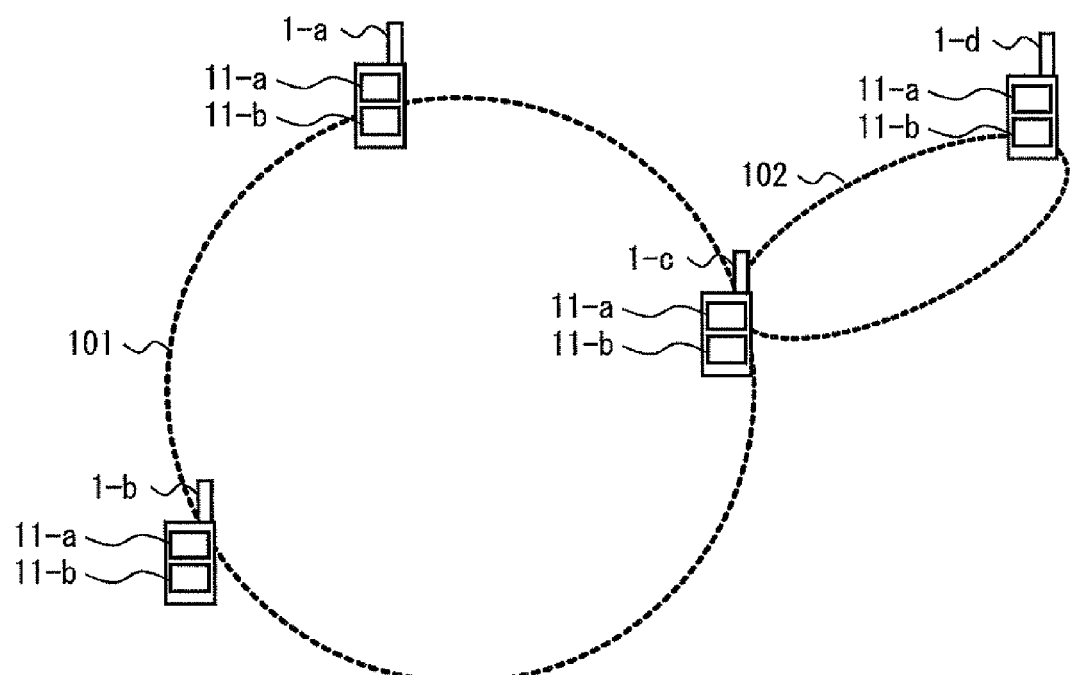
FIG. 2 is a diagram showing an example of a wireless communication system according to the first exemplary embodiment.

FIG. 2 shows an example of a wireless communication system in which communication data can be relayed across a plurality of ad-hoc communication networks. In FIG. 2, a wireless communication system 100 includes four wireless communication devices 1-*a*, 1-*b*, 1-*c* and 1-*d*. The wireless communication devices 1-*a* to 1-*d* form separate (individual) ad-hoc communication networks 101 and 102. In the ad-hoc communication network 101, the wireless communication unit 11-*a* in each of the wireless communication devices 1-*a* to 1-*c* is configured so as to use the first wireless communication configuration for conducting wireless communication, and thus can wirelessly communicate with other wireless communication devices within the ad-hoc communication network 101. This state is defined as a state where the wireless communication devices 1-*a* to 1-*c* join the ad-hoc communication network 101. In the ad-hoc communication network 102, the wireless communication unit 11-*b* in each of the wireless communication devices 1-*c* and 1-*d* is configured so as to use the second wireless communication configuration for conducting wireless communication, and thus can wirelessly communicate with other wireless communication devices within the ad-hoc communication network 102. That is, the wireless communication devices 1-*c* and 1-*d* join the ad-hoc communication network 102. Note that although each of the communication devices 1-*c* and 1-*d* includes the elements shown in FIG. 1, only the wireless communication units 11-*a* and 11-*b* are illustrated in FIG. 2, and the illustration of the other elements is omitted. Such an omission will be made in the following drawings.

At this time, the wireless communication device 1-*d* can transmit communication data to the wireless communication devices 1-*a* and 1-*b*. The wireless communication device 1-*d* transmits, through its own wireless communication unit 11-*b*, the communication data to the wireless communication device 1-*c* by use of the ad-hoc communication network 102. The wireless communication device 1-*c* receives the communication data by its own wireless communication unit 11-*b*, and transmits, through its own wireless communication unit 11-*a*, the received communication data to the wireless communication devices 1-*a* and 1-*b* by use of the ad-hoc communication network 101. That is, the wireless communication device 1-*c* performs relaying of the communication data. In this way, the wireless communication device 1 can conduct data communication across the plurality of ad-hoc communication networks.

The first wireless communication configuration and the second wireless communication configuration can be made in different frequency bands, such that the first wireless communication configuration is e.g., a VHF (Very High Frequency) band and the second wireless communication configuration is e.g., a UHF (Ultra High Frequency) band. As another example, the first wireless communication configuration and the first wireless communication configuration may be made by different modulation methods, such that the first wireless communication configuration is 16QAM (Quadrature Amplitude Modulation) and the second wireless communication configuration is 64QAM. Moreover, as the first wireless communication configuration and the second wireless communication configuration, in addition to the configuration of the above-exemplified different radio propagation characteristics, different transmission capacities may be configured. In this case, the wireless communication units 11-*a* and 11*b* can use a plurality of wireless communication configurations in which transmission capacities are different from each other. In this way, the first wireless communication configuration and the second wireless communication configuration differ from each other in these communication characteristics.

Specifically, the above-mentioned wireless communication configuration may include at least one of the following: the frequency band, the modulation method and their corresponding parameters, an access method and its corresponding parameters, a frame configuration, and radio waves transmission output. At least any one of them in the first wireless communication configuration differs from that in the second wireless communication configuration. According to such difference between any one of them, the first wireless communication configuration differs from the second wireless communication configuration in these communication characteristics. Therefore, the amount of communication bands available in wireless communication by the wireless communication device, and connection relationships to other wireless communication devices vary.

The description is continued with reference again to FIG. 1. The wireless communication unit 11 includes an antenna, a radio circuit and the like, and performs wireless connection to a different wireless communication device, transmission/reception of wireless information, conversion of electrical signals and the like. Thus, the wireless communication unit 11 performs transmission/reception of voice information, video information, textual information and the like. Note that although only two wireless communication units 11 are illustrated in FIG. 1, three or more wireless communication units may be provided in the wireless communication device 1.

The determination unit 12 determines the necessity for changing the first wireless communication configuration, at least when any one of the wireless communication units 11-a and 11-b conducts wireless communication by the first wireless communication configuration. The necessity for such changing is determined by, for example, determining whether or not the amount of available communication bands is equal to or less than a predetermined value in a wireless communication network which is formed by using the first wireless communication configuration (in this example, a configuration for conducting wireless communication by a first radio band).

The term "available communication bands" means radio bands which are not used by the wireless communication device 1 and other wireless communication devices for the wireless communication, and includes not only the current amount of available communication bands in the first radio band, but also the future amount of available communication bands in the first radio band. The phrase "the amount of available communication bands is equal to or less than a predetermined value" means that in the first radio band which is currently used or which will be used in the future for the wireless communication, the amount of available communication bands is equal to or less than a threshold indicating that communication failures such as congestion may occur. This threshold is a value which appropriately varies according to the frequency band or the modulation method.

When it is determined that such change is necessary, the determination unit 12 further determines whether or not there is a wireless communication device which becomes unable to conduct communication due to the change in the wireless communication configuration (whether or not there is an isolated wireless communication device), with respect to the wireless communication device 1 itself or another wireless communication device. In a case where there is no wireless communication device which becomes unable to conduct communication, the determination unit 12 determines that the wireless communication configuration can be changed to the second wireless communication configuration. In a case where there is a wireless communication device which becomes unable to conduct communication, the determination unit 12 determines that the wireless communication configuration cannot be changed to the second wireless communication configuration.

The "another wireless communication device", with respect to which the determination unit 12 determines whether or not it is an isolated one, may be targeted at a wireless communication device forming the same ad-hoc communication network as the wireless communication device 1 itself (the ad-hoc communication network which the wireless communication device 1 joins), may be targeted at a wireless communication device forming an ad-hoc communication network other than the ad-hoc communication network which the wireless communication device 1 joins, or may be targeted at both of these wireless communication devices. For example, assume that in FIG. 2, the determination unit 12 in the wireless communication device 1-a determines that it is necessary to change the first wireless communication configuration used by the wireless communication unit 11-a in the wireless communication device 1-a itself. In this case, the determination unit 12 may target the wireless communication devices 1-b and 1-c forming the ad-hoc communication network 101 which the wireless communication device 1-a itself joins, for determining whether or not these devices 1-b and 1-c are isolated due to the change in the wireless communication configuration. Alternatively, the determination unit 12 may target the wireless communication devices 1-c and 1-d joining the ad-hoc communication network 102 that differs from the ad-hoc communication network 101 which the wireless communication device 1-a itself joins, for determining whether or not these devices 1-c and 1-d are isolated due to the change in the wireless communication configuration. Moreover, the determination unit 12 may target, for performing the above determination, all of the wireless communication devices 1-b to 1-d forming both of the ad-hoc communication networks 101 and 102.

When the determination unit 12 determines that there is no wireless communication device which becomes unable to conduct communication due to the configuration change (i.e., determines that the wireless communication configuration can be changed to the second wireless communication configuration), the communication control unit 13 performs control for switching the wireless communication configuration used by the wireless communication unit 11 from the first wireless communication configuration to the second wireless communication configuration. When the determination 12 determines that there is a wireless communication device which becomes unable to conduct communication due to the configuration change (i.e., determines that the wireless communication configuration cannot be changed to the second wireless communication configuration), the communication control unit 13 performs control for leaving the wireless communication configuration used by the wireless communication unit 11 as the first wireless communication configuration.

The wireless communication device 1 also includes other elements which are necessary for a user to conduct wireless communication, such as a power-supply, a display, an input device and a memory. In the memory, routing information upon conducting communication within the ad-hoc communication network or toward the outside of the ad-hoc communication network may be stored. Each of the above-mentioned units in the wireless communication device 1 is materialized by hardware such as an IC (Integrated Circuit), software such as application software, or the hardware and the software.

Figure 3:
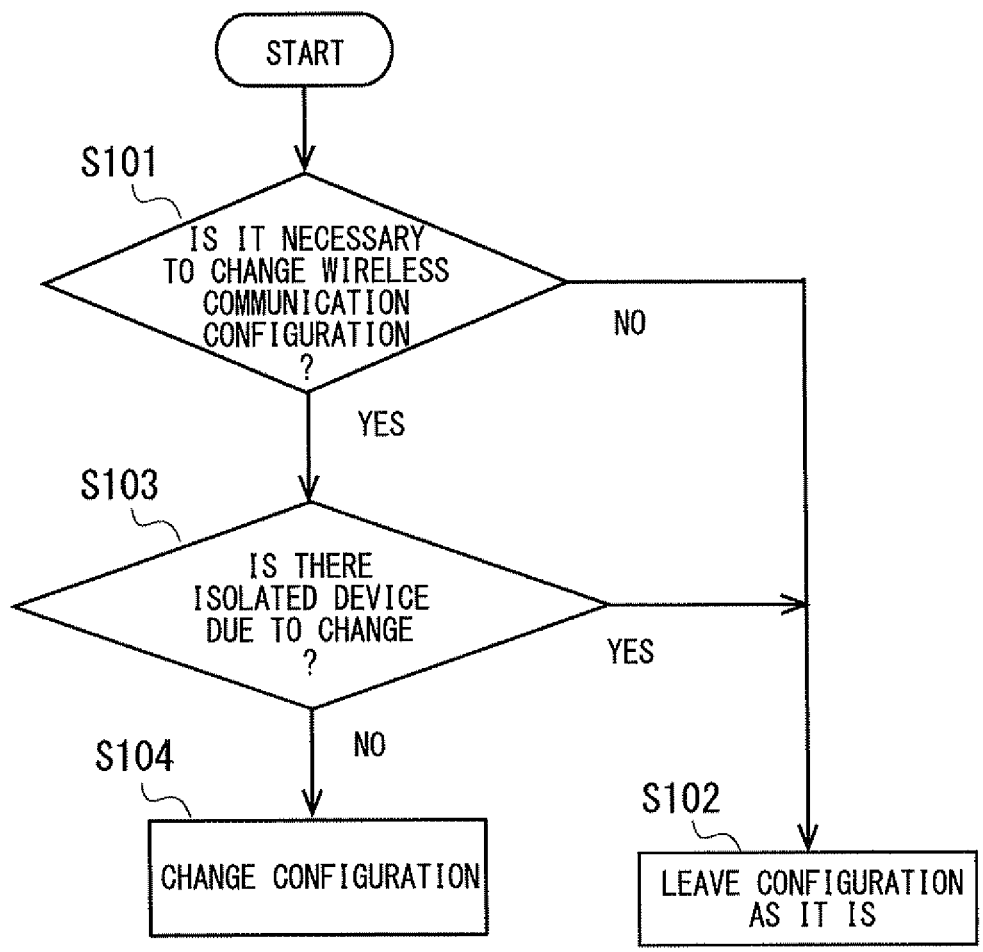
FIG. 3 is a flow chart showing an example of processes executed by a determination unit and a communication control unit according to the first exemplary embodiment.

Next, with reference to FIG. 3, there will be described processes executed by the determination unit 12 and the communication control unit 13 when the wireless communication unit 11-a or 11-b in the wireless communication device 1 uses the first wireless communication configuration to conduct wireless communication. FIG. 3 is a flow chart showing an example of the processes executed by the determination unit 12 and the communication control unit 13.

The determination unit 12 determines whether or not it is necessary to change the first wireless communication configuration to the second wireless communication configuration (step S101).

For example, in a case where the first wireless communication configuration is a configuration for conducting wireless communication by a VHF band and the second wireless communication configuration is a configuration for conducting wireless communication by a UHF band, the determination unit 12 determines whether or not the amount of available communication bands in the VHF band is equal to or less than a predetermined value. If the amount is equal to or less than the predetermined value, the determination unit 12 determines that normal communication by the VHF cannot be conducted, and determines that it is necessary to change into the UHF band which is the second wireless communication configuration.

When the determination unit 12 determines that it is not necessary to change the first wireless communication configuration to the second wireless communication configuration (No at step S101), the communication control unit 13 preforms control for leaving the wireless communication configuration used by the wireless communication unit 11 as it is (step S102).

When the determination unit 12 determines that it is necessary to change the first wireless communication configuration to the second wireless communication configuration (Yes at step S101), the determination unit 12 performs the following determination. The determination unit 12 further determines whether or not there is, among the wireless communication device itself and other wireless communication devices, a wireless communication device which becomes unable to conduct wireless communication (which will be isolated) due to the change in the wireless communication configuration (step S103).

When the determination unit 12 determines that there is a wireless communication device which becomes unable to conduct wireless communication (Yes at step S103), the communication control unit 13 performs, in accordance with a result of this determination, control for leaving the wireless communication configuration used by the wireless communication unit 11 as it is (step S102).

When the determination unit 12 determines at step S103 that there is no wireless communication device which becomes unable to conduct wireless communication (No at step S103), the communication control unit 13 performs, in accordance with a result of this determination, control for changing the wireless communication configuration used by the wireless communication unit 11 to the second wireless communication configuration (step S104).

Figure 4A:
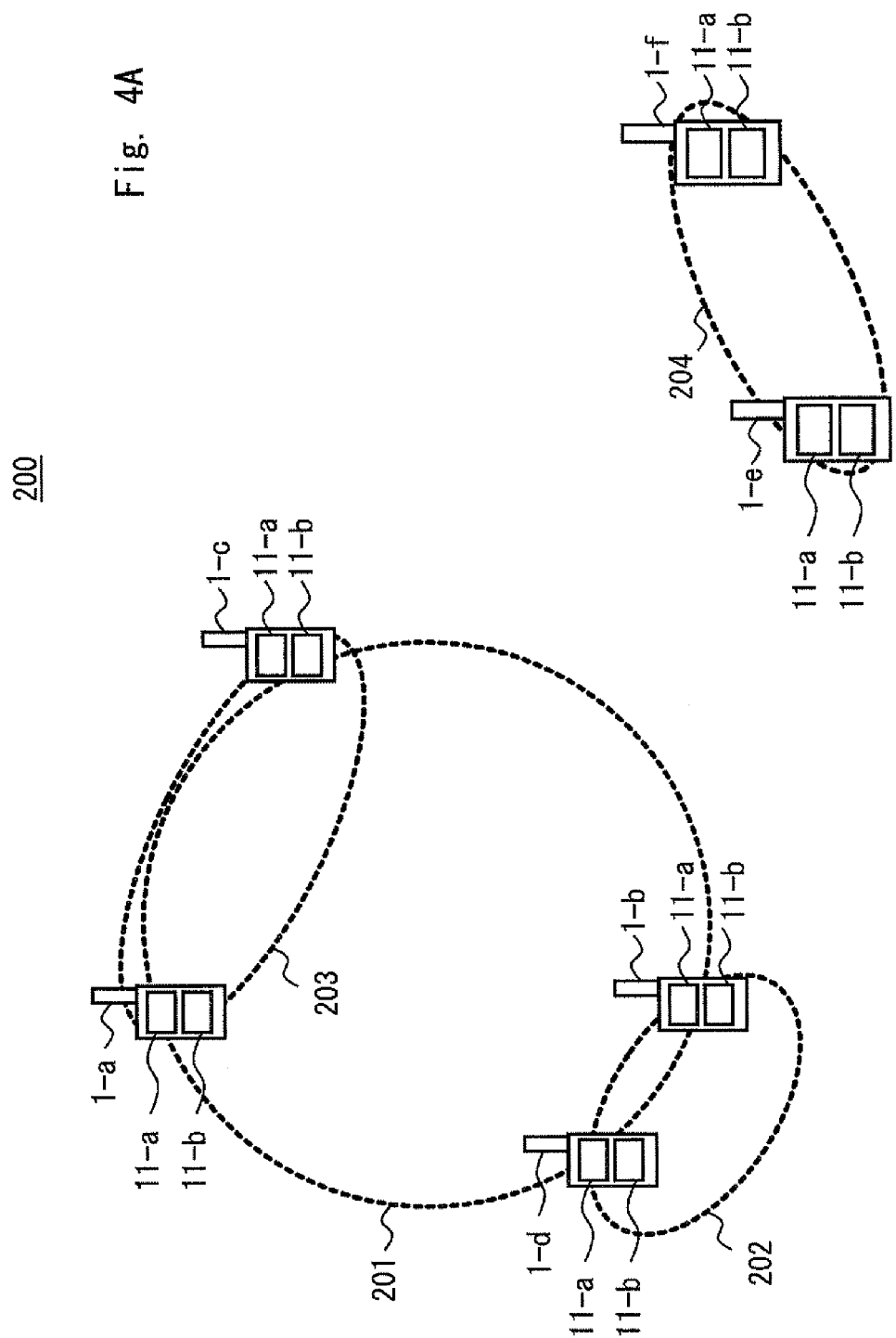
FIG. 4A is a diagram showing an example of an initial state of the wireless communication system according to the first exemplary embodiment.
Figure 4B:
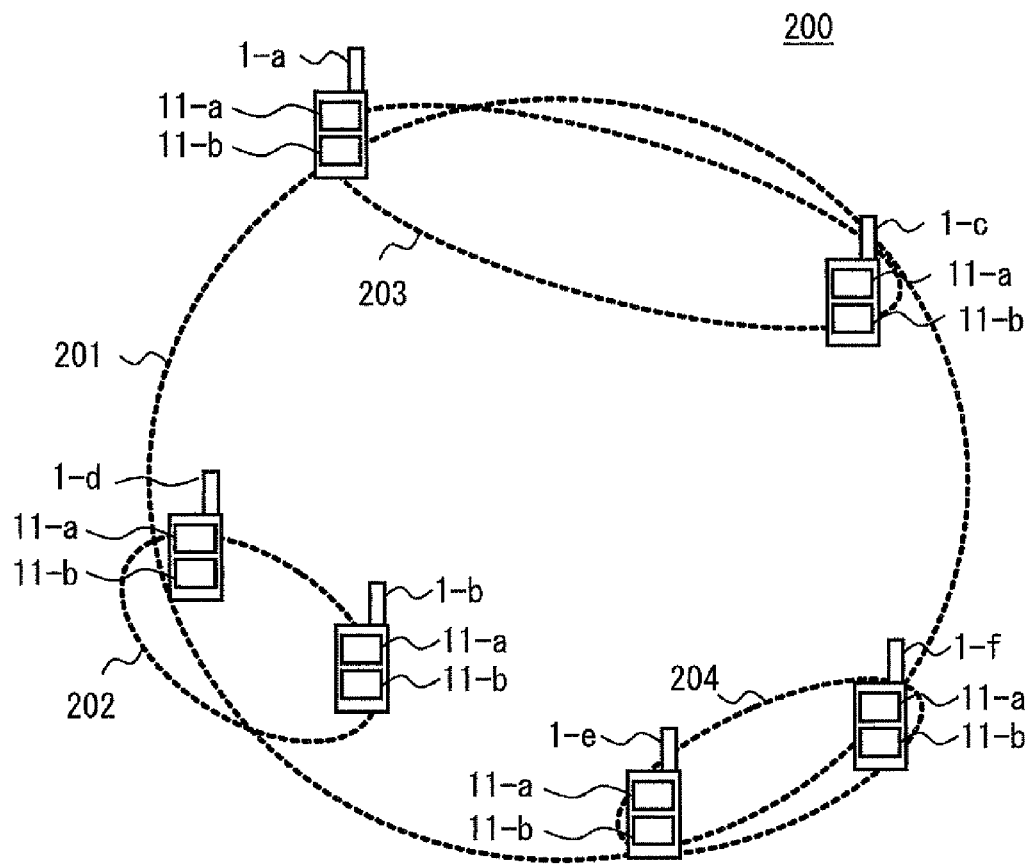
FIG. 4B is a diagram showing an example of an intermediate state of the wireless communication system according to the first exemplary embodiment.
Figure 4C:
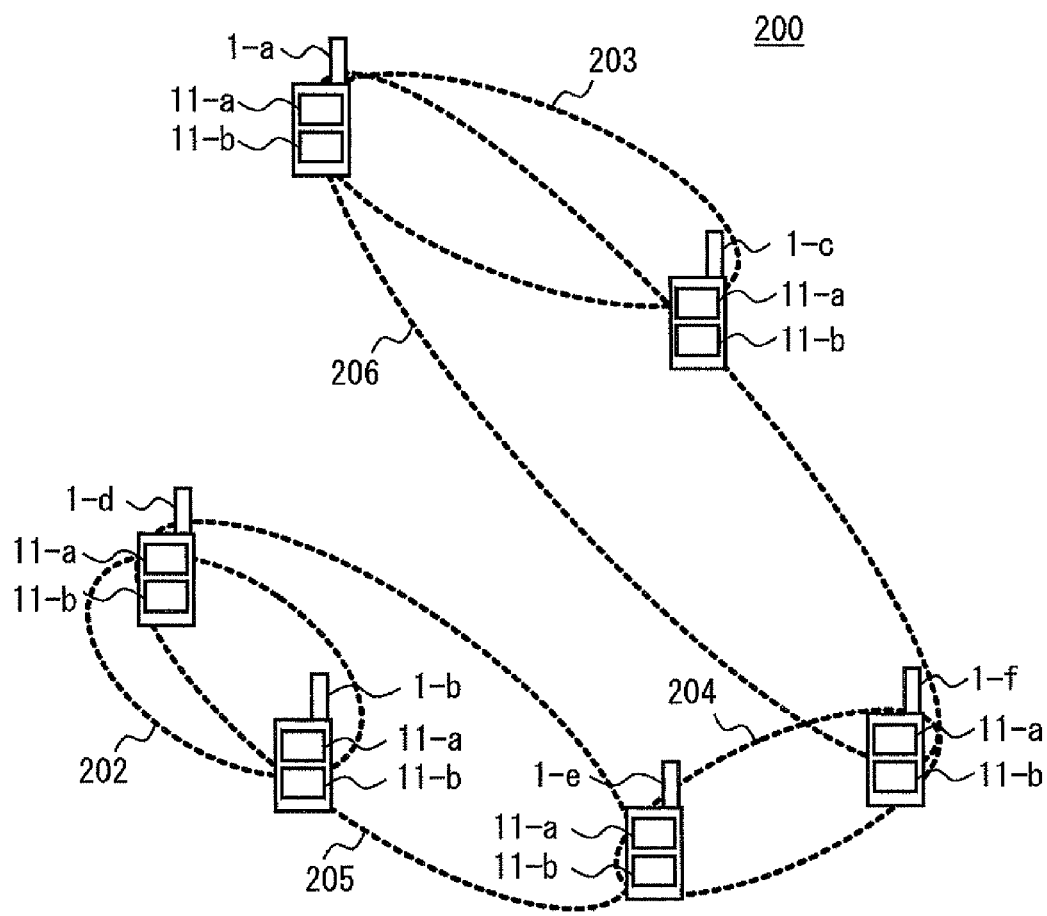
FIG. 4C is a diagram showing an example of a terminal state of the wireless communication system according to the first exemplary embodiment.

Hereinafter, with reference to FIGS. 4A to 4C, there will be described processes in a wireless communication system including the wireless communication device 1. FIGS. 4A, 4B and 4C are diagrams showing examples of states of a wireless communication system 200 according to the first exemplary embodiment. FIG. 4A shows an initial state of the wireless communication system 200, FIG. 4B shows an intermediate state of the wireless communication system 200, and FIG. 4C shows a terminal state of the wireless communication system 200.

In FIG. 4A, the wireless communication system 200 includes six wireless communication devices 1-a, 1-b, 1-c, 1-d, 1-e and 1-f. These wireless communication devices form ad-hoc communication networks 201, 202, 203 and 204.

The ad-hoc communication network 201 is a wireless communication network in which wireless communication units 11-a in the wireless communication devices 1-a, 1-b, 1-c and 1-d conduct wireless communication. The ad-hoc communication network 202 is a wireless communication network in which wireless communication units 11-b in the wireless communication devices 1-b and 1-d conduct wireless communication. The ad-hoc communication network 203 is a wireless communication network in which wireless communication units 11-b in the wireless communication devices 1-a and 1-c conduct wireless communication. The ad-hoc communication network 204 is a wireless communication network in which wireless communication units 11-b in the wireless communication devices 1-e and 1-f conduct wireless communication. In FIG. 4A, the wireless communication devices 1-e and 1-f are in a faraway place where they cannot communicate with the wireless communication devices 1-a, 1-b, 1-c and 1-d. Therefore, the wireless communication devices 1-a, 1-b, 1-c and 1-d cannot join the ad-hoc communication network 204.

In the ad-hoc communication network 201, a radio band in the VHF band is used as the first wireless communication configuration. Therefore, in the ad-hoc communication network 201, wireless communication is conducted, which can reach a far distance and is a narrow band. In the ad-hoc communication networks 202, 203 and 204, a radio band in the UHF band is used as the second wireless communication configuration. Therefore, in the ad-hoc communication networks 202, 203 and 204, wireless communication is conducted, which can reach just a short distance and is a broad band. In FIG. 6A, the wireless communication units 11-a in the wireless communication devices 1-a to 1-d conduct wireless communication by the same method using the same VHF band, and the wireless communication units 11-b in the wireless communication devices 1-a to 1-f conduct wireless communication by the same method using the same UHF band. Note that in the ad-hoc communication network 201, available communication bands in the VHF band are more than predetermined values.

When the determination unit 12 in each of the wireless communication devices 1-a to 1-d performs the determination shown at step S101 in FIG. 3, the determination unit 12 determines that available communication bands in the VHF band are more than predetermined values, and therefore determines that it is not necessary to switch the wireless communication configuration (it is not necessary to switch the communication band from the VHF band to the UHF band) (No at step S101). Accordingly, the communication control unit 13 leaves the used radio band as it is (step S102). In this case, the wireless communication devices 1-a to 1-d remain to join the ad-hoc communication network 201, and thus do not pull out of the ad-hoc communication network 201.

Next, the state shown in FIG. 4B will be described. FIG. 4B shows a state where moved from the initial state shown in FIG. 4A, the wireless communication devices 1-e and 1-f join the ad-hoc communication network 201. For example, processes for joining by the wireless communication devices 1-d are as follows. Firstly, the wireless communication devices 1-e and 1-f move from the initial state shown in FIG. 4A, and thus any one of the wireless communication devices 1-e and 1-f goes into a state where it can communicate with any one of the wireless communication devices 1-a to 1-d. Then, the wireless communication unit 11 in the wireless communication device 1-d receives, from any one of the wireless communication devices 1-a to 1-d, information on the wireless communication configuration used in the ad-hoc communication network 201. In response to this reception, the wireless communication unit 11 in any one of the wireless communication devices 1-*e* and 1-*f* sets the wireless communication configuration for wireless use with the first wireless communication configuration. Then, communication for control data in an ad-hoc network protocol is conducted to make up routing information within the ad-hoc communication network 201, the wireless communication devices 1-*e* and 1-*f* join the ad-hoc communication network 201, and the wireless communication devices 1-*a* to 1-*f* conduct wireless communication by the first wireless communication configuration. Thus, as shown in FIG. 4B, the wireless communication devices 1-*e* and 1-*f* join the ad-hoc communication network 201.

Note that information, which the wireless communication device 1-*e* or 1-*f* receives, may include information on wireless communication devices joining the ad-hoc communication network 201, a connection relationship therebetween and the like, in addition to the information on the wireless communication configuration used in the ad-hoc communication network 201. The wireless communication device 1-*e* or 1-*f* may, for example, recognize all wireless communication devices within the ad-hoc communication network 201 based on the received information, as a substitute for obtaining all wireless communication devices within the ad-hoc communication network 201 from the routing information generated by the ad-hoc network protocol. Thus, the wireless communication device 1-*e* or 1-*f* creates intra-network routing information and inter-network routing information.

The state shown in FIG. 4B transits to a state where an attempt is made to conduct broad-band communication between the wireless communication devices 1-*d* and 1-*e*, as well as between the wireless communication devices 1-*a* and 1-*f*. This broad-band communication corresponds to e.g., transmission/reception of video data (high-quality video delivery etc.). In this example, the wireless communication device 1-*d* transmits, to the wireless communication device 1-*e*, data indicating that the broad-band communication is started, and the wireless communication device 1-*a* transmits, to the wireless communication device 1-*f*, data indicating that the broad-band communication is started.

The determination unit 12 in the wireless communication device 1-*d* detects that the communication environment will be changed in the future due to the conduction of broad-band communication. The determination unit 12 in the wireless communication device 1-*d* uses this detection as a trigger to determine whether or not the amount of available communication bands in the VHF band, which are used by the wireless communication unit 11-*a* in the wireless communication device 1-*d* itself, is equal to or less than a predetermined value (i.e., whether or not it is necessary to switch the wireless communication configuration) (step S101 in FIG. 3). The wireless communication device 1-*a* may perform signaling for ensuring the communication bands prior to transmitting communication data for the broad-band communication, and the determination unit 12 in the wireless communication device 1-*d* may receive the signal to detect that the communication environment will be changed.

The determination unit 12 determines that the amount of available communication bands in the VHF band becomes equal to or less than the predetermined value (becomes insufficient) due to the broad-band communication which the wireless communication device 1-*d* itself attempts to start. In this case, as described above, there is a possibility of causing the failures such as congestion. Therefore, the determination unit 12 determines that it is necessary to switch the wireless communication configuration (Yes at step S101).

In accordance with a result of this determination, the determination unit 12 determines whether or not there is a wireless communication device which becomes unable to conduct wireless communication upon switching the radio band used by the wireless communication unit 11-*a* to the UHF band, among the wireless communication device 1-*d* itself and other wireless communication devices forming the same ad-hoc communication networks 201 and 202 together with the wireless communication device 1-*d* itself. In other words, the determination unit 12 determines whether or not there is an isolated wireless communication device when the wireless communication configuration is switched from the first wireless communication configuration to the second wireless communication configuration (step S103).

For example, the determination unit 12 may determine whether or not a distance between the wireless communication device 1-*d* itself and each of other wireless communication devices 1-*a* to 1-*c* and 1-*e* to 1-*f* is farther than a distance which radio waves can reach in the UHF band, thereby determining whether or not the wireless communication device 1-*d* itself becomes unable to conduct the wireless communication. Alternatively, the determination unit 12 may perform this determination by determining, based on the strength of radio waves obtained by the wireless communication device 1-*d* itself from other wireless communication devices, whether or not it is possible to obtain the strength of radio waves which has no problem in receiving signals even if the radio band is changed.

In this case, the determination unit 12 determines that the wireless communication device 1-*d* itself can conduct wireless communication by the UHF band with the wireless communication device 1-*e*. Moreover, the determination unit 12 determines that there is no wireless communication device among the wireless communication devices 1-*a* to 1-*c* and 1-*e* to 1-*f*, which becomes unable to conduct wireless communication due to switching the configuration of the wireless communication unit 11-*a* in the wireless communication device 1-*d* itself to the UHF band. That is, the determination unit 12 determines that even when the wireless communication configuration is switched, each wireless communication device can surely conduct wireless communication with any one of other wireless communication devices, and thus there is no (isolated) wireless communication device which becomes unable to conduct wireless communication with another wireless communication device (No at step S103).

Therefore, the determination unit 12 determines that it is possible to change the band used by the wireless communication unit 11-*a* to the UHF band (it is possible to pull out of the current ad-hoc communication network 201). Based on this determination, the communication control unit 13 in the wireless communication unit 1-*d* performs control so as to change the band used by the wireless communication unit 11-*a* to the UHF band (so as to switch the wireless communication configuration to the second wireless communication configuration) (step S104).

The wireless communication unit 11-*a* in the wireless communication device 1-*e* acquires data which is output from the wireless communication device 1-*d* and indicates that the broad-band communication is started. The determination unit 12 in the wireless communication device 1-*e* uses this data acquisition as a trigger to perform determination and change of the configuration in a manner similar to that in the wireless communication device 1-*d*. Thus, the band used by the wireless communication unit 11-*a* in the wireless communication device 1-*e* is changed to the UHF band.

According to the above processes in the wireless communication devices 1-*d* and 1-*e*, the band used for wireless communication by each of the wireless communication units 11-*a* in the wireless communication devices 1-*d* and 1-*e* is changed to the UHF band. Thus, the wireless communication units 11-*a* in the wireless communication devices 1-*d* and 1-*e* pull out of the ad-hoc communication network 201, and a new ad-hoc communication network 205 is constructed, in which wireless communication is conducted by using the UHF band.

The wireless communication devices 1-*a* and 1-*f* perform processes and configuration change in a manner similar to that in the wireless communication devices 1-*d* and 1-*e*, respectively. Thus, the wireless communication units 11-*a* in the wireless communication devices 1-*a* and 1-*f* pull out of the ad-hoc communication network 201, and a new ad-hoc communication network 206 is constructed, in which wireless communication is conducted by using the UHF band.

FIG. 4C shows the ad-hoc communication networks 205 and 206 generated in such a manner as described above. In the ad-hoc communication networks 205 and 206, the wireless communication devices 1-*a*, 1-*f*, 1-*d* and 1-*e* conduct wireless communication by using the UHF band.

Note that the ad-hoc communication networks 205 and 206 would be similarly constructed, even if the wireless communication device 1-*e* transmits to the wireless communication device 1-*d* data indicating that the broad-band communication is started, and the wireless communication device 1-*f* transmits to the wireless communication device 1-*a* data indicating that the broad-band communication is started.

According to the above processes, it is possible to ensure the amount of communication bands for communication applications to transmit information in the case where the broad-band communication is conducted. Moreover, it is possible to ensure that there is no wireless communication device which cannot conduct communication in the case where the band is changed from the VHF band to the UHF band. Therefore, it is possible to ensure the amount of communication bands for the information transmission without reducing the number of wireless communication devices which can conduct communication.

In the above explanation as to FIGS. 4B and 4C, there has been described as one example a pattern where when the broad-band communication is directly conducted between two wireless communication devices (without being relayed through another wireless communication device), the wireless communication device 1-*d* starting the broad-band communication and the wireless communication device 1-*e* serving as a destination of the broad-band communication each change the wireless communication configuration. Meanwhile, in a case where another wireless communication device relays broad-band communication data, not only the source wireless communication device and the destination wireless communication device, but also the device relaying the communication data may further execute the process to change the wireless communication configuration.

In the above explanation as to FIGS. 4B and 4C, there has been described as one example a pattern where the transmission of data indicating that the broad-band communication is started (i.e., the execution of signaling) is used as the trigger to execute the process to change the wireless communication configuration prior to starting the broad-band communication. Meanwhile, transmission or reception of data for the broad-band communication after it is started may be used as a trigger for some or all of the wireless communication devices transmitting the broad-band communication data, a wireless communication device relaying the broad-band communication data and a wireless communication device receiving the broad-band communication data to execute the above-described process to change the wireless communication configuration.

In a case where there is an ad-hoc communication network differing from the ad-hoc communication networks 201 and 202 which the wireless communication device 1-*d* joins, the determination unit 12 in the wireless communication device 1-*d* may also target a wireless communication device joining this ad-hoc communication network, for determining whether or not it is isolated due to the change in the wireless communication configuration.

If the wireless communication unit 11-*a* in the wireless communication device 1-*d* itself is currently conducting data communication, the determination unit 12 in the wireless communication device 1-*d* may determine that the wireless communication unit 11-*a* cannot change the used band in order not to interfere with the data communication.

Figure 5:
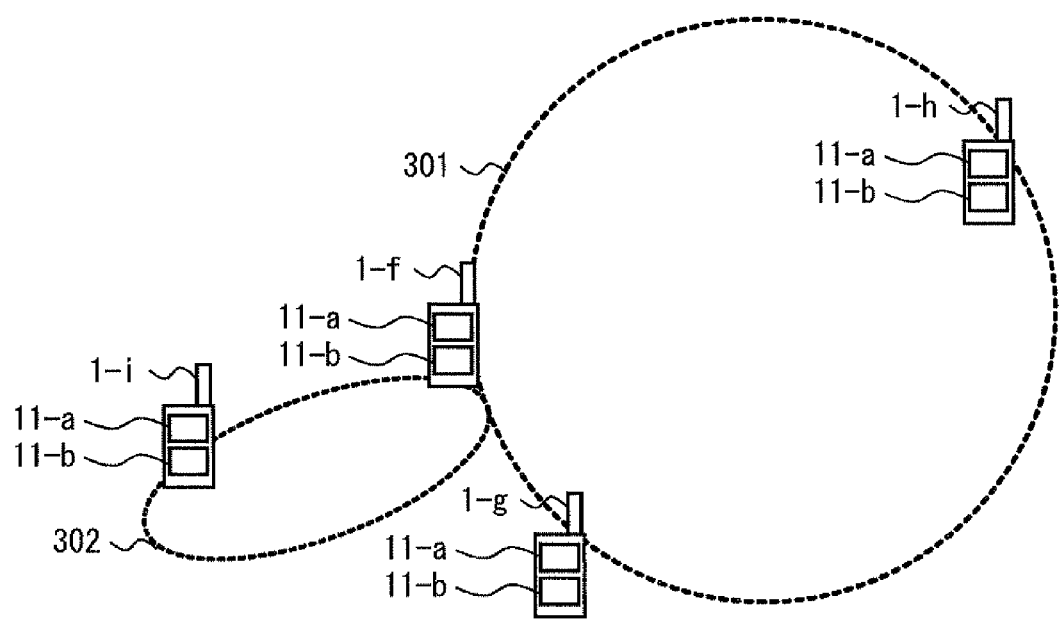
FIG. 5 is a diagram showing another example of the wireless communication system according to the first exemplary embodiment.

Hereinafter, the processes executed by the wireless communication system will be further described with reference to FIG. 5. FIG. 5 is a diagram showing another example of the wireless communication system. In FIG. 5, a wireless communication system 300 includes wireless communication devices 1-*f*, 1-*g*, 1-*h* and 1-*i*. Each of wireless communication units 11-*a* in the wireless communication devices 1-*f* to 1-*h* conducts wireless communication by using the first wireless communication configuration for conducting the wireless communication in the VHF band. Thus, the wireless communication devices 1-*f* to 1-*h* form an ad-hoc communication network 301 in which the VHF band is used. Each of wireless communication units 11-*b* in the wireless communication devices 1-*f* and 1-*i* conducts wireless communication by using the second wireless communication configuration for conducting the wireless communication in the UHF band. Thus, the wireless communication devices 1-*f* and 1-*i* form an ad-hoc communication network 302 in which the UHF band is used.

In FIG. 5, the wireless communication devices 1-*f* and 1-*g* are located within a distance which radio waves reach in the UHF band, but the wireless communication devices 1-*f* and 1-*h*, as well as the wireless communication devices 1-*g* and 1-*f*, are located outside the distance which radio waves reach in the UHF band.

Hereinafter, processes executed by the wireless communication device 1-*f* will be described in a manner similar to that shown in FIG. 4B.

Assume a state where the wireless communication devices 1-*f* and 1-*g* attempt to conduct broad-band communication therebetween. At this time, the determination unit 12 in the wireless communication device 1-*f* uses this state as a trigger to perform the determination shown in FIG. 3. At step S101, the determination unit 12 in the wireless communication device 1-*f* determines that the amount of available communication bands is equal to or less than a predetermined value when the wireless communication unit 11-*a* conducts the broad-band communication. Thus, the determination unit 12 in the wireless communication device 1-*f* determines that it is necessary to change the wireless communication configuration in the wireless communication unit 11-*a* (Yes at step S101).

Next, at step S102, the determination unit 12 in the wireless communication device 1-*f* determines that the wireless communication device 1-*f* itself can conduct wireless communicate with the wireless communication device 1-*e* even if the radio band used by the wireless communication unit 11-*a* is changed to the UHF band. The determination unit 12 further determines whether or not there is a wireless communication device which becomes unable to conduct wireless communication due to switching the band used for the wireless communication by the wireless communication unit 11-*a* in the wireless communication device 1-*f* itself to the UHF band, among other wireless communication device in the ad-hoc communication networks 301 and 302.

As described above, the distance from the wireless communication device 1-*h* to each of the wireless communication devices 1-*f* and 1-*g* is beyond the distance which radio waves reach in the UHF band. The wireless communication device 1-*h* joins only the ad-hoc communication network 301, and thus becomes unable to conduct the wireless communication due to the switch into the UHF band. Therefore, the determination unit 12 in the wireless communication device 1-*h* determines that the wireless communication device 1-*h* will be isolated due to switching the band used by the wireless communication device 1-*h* itself to the UHF band and pulling out of the ad-hoc communication network 301 (due to switching the wireless communication configuration to the second wireless communication configuration) (Yes at step S103). Based on this determination, the wireless communication device 1-*f* leaves the band used for the wireless communication as the VHF band (step S102). Thus, the wireless communication device 1-*f* executes processes so as not to have the wireless communication device 1-*h* isolated. The determination unit 12 executes the above determination processes based on e.g., intra-network routing information had by the wireless communication device 1-*d*, inter-network routing information or both of them.

Note that not only the wireless communication device 1-*f*, but also the wireless communication devices 1-*g* to 1-*i* can execute processes similar to the above ones.

In the above processes, there has been described an example where the first wireless communication configuration is the configuration for the wireless communication using the VHF band, and the second wireless communication configuration is the configuration for the wireless communication using the UHF band. Meanwhile, the contents of the configuration may be also the ones according to other communication characteristics.

Furthermore, although the determination unit 12 in each wireless communication device uses the change in communication environment as the trigger to execute the processes shown in FIG. 3, the determination unit 12 may execute the processes shown in FIG. 3 at predetermined intervals.

By the above processes, the wireless communication device according to the first exemplary embodiment can ensure that the amount of communication bands for information transmission is as large as possible, without reducing the number of wireless communication devices which can conduct communication. This is because the wireless communication device executes the following processes.

(1) When it is determined that it is necessary to change the first wireless communication configuration used by a wireless communication unit, and when no isolated wireless communication arises due to the change, the wireless communication device performs control such that the wireless communication unit uses the second wireless communication configuration which differs from the first wireless communication configuration in communication characteristics. The reason for this is to be able to aim to ensure the amount of communication bands for information transmission.

(2) When the isolated wireless communication arises due to the change, the used configuration is not changed even if it is determined that it is necessary to change the first wireless communication configuration. The reason for this is to be able not to cause an isolated wireless communication device.

The above advantageous effects cannot be achieved by the Patent Literatures 1 to 3 and Non-Patent Literatures 1 to 2. For example, Patent Literature 2 discloses an ad-hoc network which can form a plurality of dissimilar networks. However, in Patent Literature 2, it is not possible to ensure that the amount of communication bands for information transmission is as large as possible without reducing the number of wireless communication devices which can conduct communication.

Note that in the wireless communication system, all wireless communication devices are not required to include the elements shown in FIG. 1, and thus one or some of the wireless communication devices may include the elements shown in FIG. 1. For example, in FIG. 5, the wireless communication device 1-*h* may not include the elements shown in FIG. 1. In this case, the wireless communication device 1-*h* cannot determine whether or not the wireless communication device 1-*h* is isolated. As a substitute for the wireless communication device 1-*h*, the wireless communication device 1-*f*, 1-*i* or 1-*g* performs the determination, thereby enabling the wireless communication device 1-*h* not to be isolated.

The order of executing the processes at steps S101 and S103 shown in FIG. 3 may be changed. Specifically, the determination unit 12 executes the following processes. Firstly, the determination unit 12 determines whether or not a wireless communication device which becomes unable to conduct wireless communication arises due to changing the first wireless communication configuration to the second wireless communication configuration in the wireless communication unit using the first wireless communication configuration, among the wireless communication device itself and other wireless communication devices (first determination step). Next, when it is determined that there is no wireless communication device which becomes unable to conduct wireless communication, the determination unit 12 determines whether or not it is necessary to change the first wireless communication configuration (second determination step). When the determination unit 12 determines at the second determination step that it is necessary to change the first wireless communication configuration, the communication control unit perform control to switch the wireless communication configuration used by the wireless communication unit from the first wireless communication configuration to the second wireless communication configuration. When the determination unit 12 determines at the first determination step that there is a wireless communication device which becomes unable to conduct wireless communication, or when the determination unit 12 determines at the second determination step that it is not necessary to change the first wireless communication configuration, the communication control unit 13 performs control to leave the wireless communication configuration used by the wireless communication unit as the first wireless communication configuration. As describe above, these processes are executed by using e.g., the change in communication environment as the trigger.

As another specific example, the determination unit 12 may execute the processes at steps S101 and S103 all at once, in particular as follows. When the determination unit 12 determines that "it is necessary to change the first wireless communication configuration to the second wireless communication configuration" and determines that "no wireless communication device which becomes unable to conduct wireless communication arises even if the configuration is changed to the second wireless communication configuration", the communication control unit 13 performs control to switch the wireless communication configuration used by the wireless communication unit from the first wireless communication configuration to the second wireless communication configuration. If other determination results (i.e., a result of determination that "it is not necessary to change the first wireless communication configuration to the second wireless communication configuration", or a result of determination that "a wireless communication device which becomes unable to conduct wireless communication arises when the configuration is changed to the second wireless communication configuration") are obtained, the communication control unit 13 performs control to leave the wireless communication configuration used by the wireless communication unit as the first wireless communication configuration.

That is, the determination unit 12 may determine, in the case where any one of wireless communication units uses the first wireless communication configuration to conduct wireless communication, at least whether or not there is a wireless communication device which becomes unable to conduct wireless communication due to changing the first wireless communication configuration to the second wireless communication configuration, among the wireless communication device itself and other wireless communication devices. When the determination unit 12 determines that there is no wireless communication device which becomes unable to conduct wireless communication, and if it is necessary to change the first wireless communication configuration, the communication control unit 13 performs control to switch the wireless communication configuration used by the wireless communication unit to the second wireless communication configuration. When the determination unit 12 determined that there is a wireless communication device which becomes unable to conduct wireless communication, the communication control unit 13 may perform control to leave the wireless communication configuration used by the wireless communication unit as first wireless communication configuration.

The "case where it is necessary to change the first wireless communication configuration" may include, for example, a case where the amount of available communication bands is equal to or less than a predetermined value in an ad-hoc communication network formed by using the first wireless communication configuration, or a case where wireless communication with another wireless communication device is not stable. The details of this "stability of wireless communication" will be described in a second exemplary embodiment. The "case where it is necessary to change the first wireless communication configuration" may be determined by the determination unit 12 as described above, or may be determined at the wireless communication unit by detecting change in signals originating from other wireless communication devices.

Second Exemplary Embodiment

Figure 6:
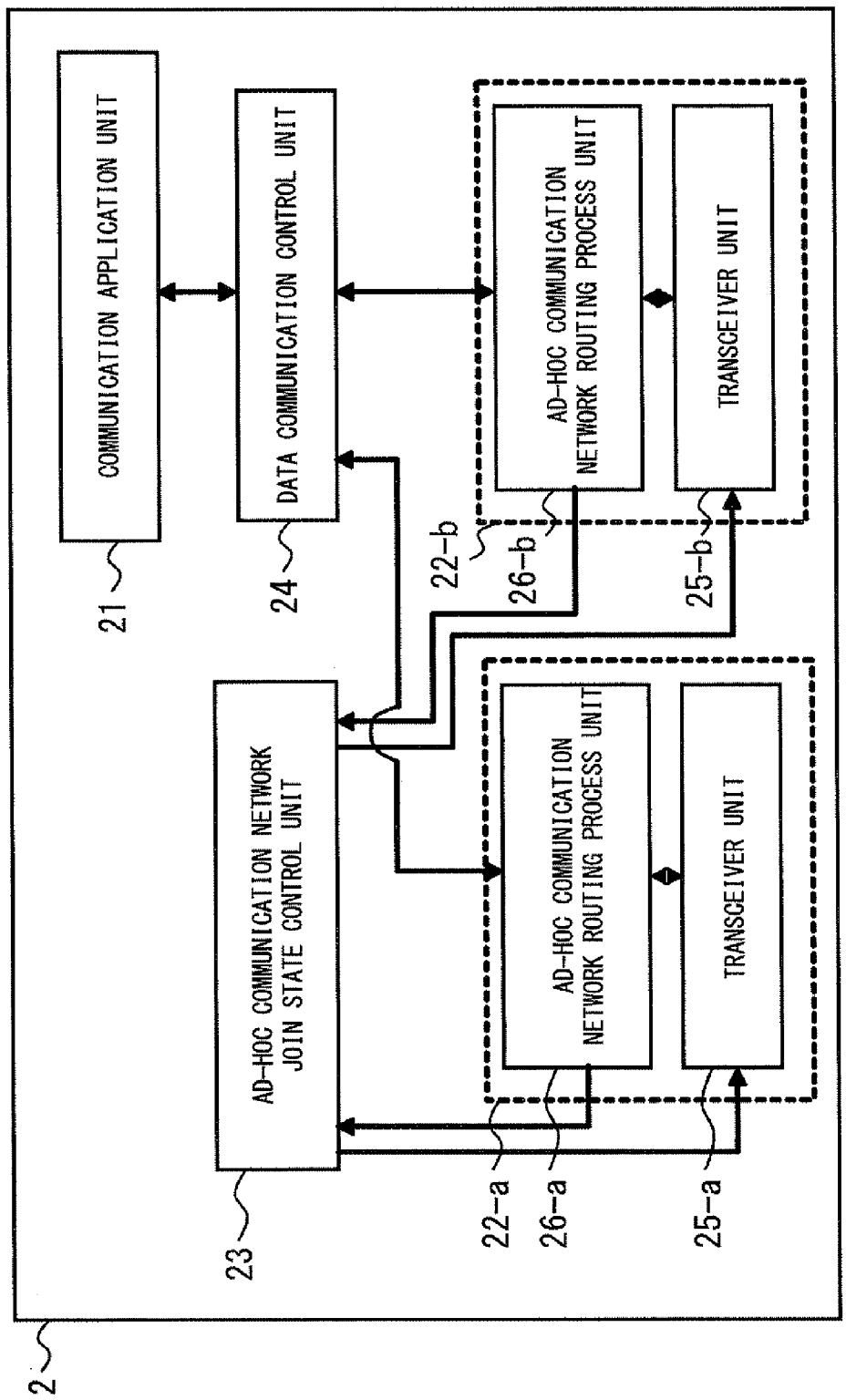
FIG. 6 is a block diagram showing a configuration example of a wireless communication device according to a second exemplary embodiment.

Hereinafter, a second exemplary embodiment of the present invention will be described with reference to the accompany drawings. FIG. 6 is a block diagram showing a configuration example of a wireless communication device according to the second exemplary embodiment. A wireless communication device 2 includes a communication application unit 21, two radio units 22 (radio units 22-*a* and 22-*b*), an ad-hoc communication network join state control unit 23, and a data communication control unit 24.

The communication application unit 21 conducts data communication such as voice communication, video delivery and Web, and executes software for the communication.

The radio unit 22-*a* includes a transceiver unit 25-*a* and an ad-hoc network routing process unit 26-*a*. Similarly, the radio unit 22-*b* includes a transceiver unit 25-*b* and an ad-hoc network routing process unit 26-*b*. The radio units 22-*a* and 22-*b* correspond to the wireless communication units 11-*a* and 11-*b* in FIG. 1.

The transceiver unit 25-*a* configures a wireless communication method such as a frequency, a frequency band, a modulation method and an access method, or changes the configuration. The transceiver unit 25-*a* transmits and receives radio waves by using the configured wireless communication method, and thus transmits communication data between the wireless communication device and other wireless communication devices. Moreover, the transceiver unit 25-*a* monitors a band used for transmitting the communication data and a state of radio waves output from other wireless communication devices. The transceiver unit 25-*a* can use a VHF band (low frequency band) and a UHF band (high frequency band) which are switched from one to another, and the VHF band has a shorter reachable distance and a broader band than those of the UHF band. Note that frequency bands other than the VHF band and the UHF band may be used upon the implementation.

The ad-hoc network routing process unit 26-*a* uses an ad-hoc network protocol such as OLSR (Optimized Link State Routing) standardized as RFC 3626 in IETF (Internet Engineering Task Force) or a protocol similar thereto to create and store intra-network routing information. In accordance with the stored intra-network routing information, the ad-hoc network routing process unit 26-*a* transfers the communication data within the ad-hoc communication network in which the transceiver unit 25-*a* conducts wireless communication. Moreover, the ad-hoc network routing process unit 26-*a* provides the intra-network routing information to the ad-hoc communication network join state control unit 23.

The transceiver unit 25-*b* and the ad-hoc network routing process unit 26-*b* execute processes similar to those executed by the transceiver unit 25-*a* and the ad-hoc network routing process unit 26-*a*, respectively.

The ad-hoc communication network join state control unit 23 acquires intra-network routing information from the ad-hoc network routing process units 26-*a* and 26-*b*. The ad-hoc communication network join state control unit 23 receives notifications from the transceiver units 25-*a* and 25-*b*, and then determines whether or not each transceiver unit pulls out the ad-hoc communication network in which it currently conducts wireless communication and whether or not each transceiver unit joins another ad-hoc communication network. As a result of this determination, if the above pulling out or joining is performed, the ad-hoc communication network join state control unit 23 changes the configuration of the transceiver unit 25-*a* or 25-*b*. This ad-hoc communication network join state control unit 23 corresponds to the determination unit 12 and the communication control unit 13 in FIG. 1.

The data communication control unit 24 creates and stores inter-network routing information between ad-hoc communication networks in which each transceiver unit is currently conducting wireless communication. Then, if it is necessary to transfer the communication data between the ad-hoc communication networks, the data communication control unit 24 controls the radio unit 22-*a* or 22-*b* so as to transfer the communication data between the ad-hoc communication networks by using the stored inter-network routing information. The data communication control unit 24 receives a communication request from the communication application unit 21, determines an ad-hoc communication network to be used for transferring the communication data, transfers the determined ad-hoc communication network, and provides the inter-network routing information to the ad-hoc communication network join state control unit 23.

As to the creation and maintenance of the inter-network routing information, for example, a routing protocol which has an inter-network routing function like OSPF (Open Shortest Path First) standardized as RFC 2328 in the IETF serving as the existing technology, or a protocol similar thereto can be used. For example, in FIG. 4B in the first exemplary embodiment, the wireless communication device 1-*e* or 1-*f* may generate the routing information by this ad-hoc network protocol.

Note that the ad-hoc communication network join state control unit 23 may be included in all wireless communication devices which are in the same ad-hoc communication network. Alternatively, only one or some of the wireless communication devices in the same ad-hoc communication network may include the ad-hoc communication network join state control unit 23, and the ad-hoc communication network join state control unit 23 may collectively execute a process to control states where other wireless communication devices join the ad-hoc communication network. The communication application unit 21, and the radio units 22-*a* and 22-*b* may be mounted not only within a housing of the same wireless communication device, but also within different housings.

The wireless communication device 2 also includes other elements which are necessary for a user to conduct wireless communication, such as a power-supply, a display and an input device. Each of the above-mentioned units in the wireless communication device 2 is materialized by hardware such as an IC (Integrated Circuit), software such as application software, or the hardware and the software.

Figure 7A:
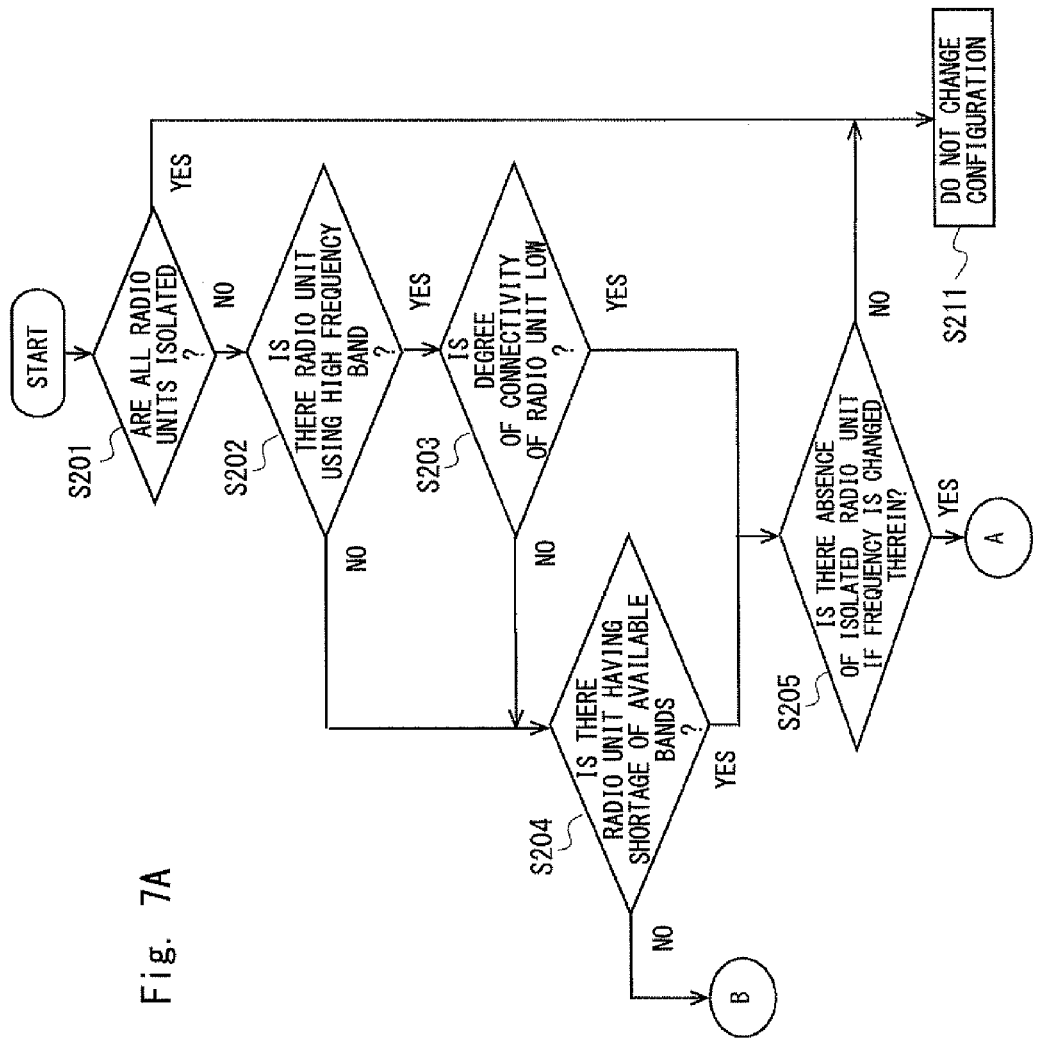
FIG. 7A is a first flow chart showing an example of processes executed by an ad-hoc communication network join state control unit according to the second exemplary embodiment.
Figure 7B:
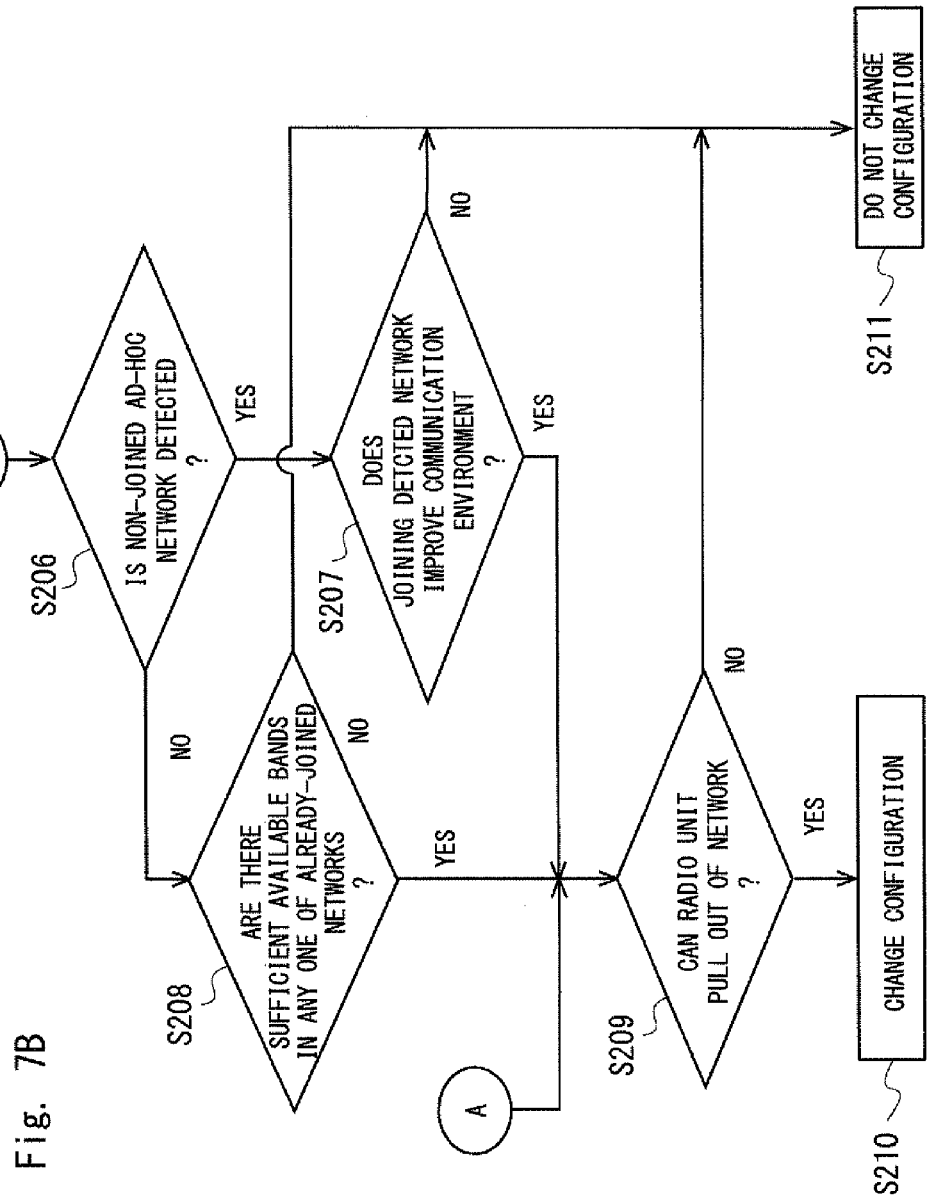
FIG. 7B is a second flow chart showing an example of processes executed by the ad-hoc communication network join state control unit according to the second exemplary embodiment.

Next, with reference to FIGS. 7A and 7B, there will be described a flow of processes of the ad-hoc communication network join state control executed by the ad-hoc communication network join state control unit 23 in the wireless communication device according to the second exemplary embodiment. FIGS. 7A and 7B are flow charts showing examples of the processes executed by the ad-hoc communication network join state control unit 23 according to the second exemplary embodiment. Note that in a case where a plurality of frequency bands cannot be used, some of the following control processes may not be executed.

These control processes are executed by the ad-hoc communication network join state control unit 23 by using as a trigger changes in the communication environment of the wireless communication device itself. For example, the changes in the communication environment are as follows. Examples of them include the situation where the ad-hoc communication network join state control unit 23 receives from the transceiver units 25-*a* and 25-*b* notifications about changes in the strength of radio waves originating from neighboring other wireless communication devices (e.g., in the same ad-hoc communication network as the wireless communication itself), or the situation where the ad-hoc communication network join state control unit 23 acquires the intra-network routing information from the ad-hoc communication network routing process units 26-*a* and 26-*b* and then detects based on this information that there is changed a connection relationship between wireless communication devices in ad-hoc communication networks. The phrase "there is changed a connection relationship between wireless communication devices in ad-hoc communication networks" means that a change in the wireless communication devices joining the ad-hoc communication networks occurs, and a wireless communication device newly joining the networks or a wireless communication device pulling out of the networks arises. The ad-hoc communication network may be only the ad-hoc communication network which the wireless communication device itself joins, or may include another ad-hoc communication network recognized by the inter-network routing information, which the wireless communication device itself does not join. Further, the examples also include the situation where the ad-hoc communication network join state control unit 23 receives the communication request from the communication application unit 21 in the wireless communication device itself. Furthermore, the above examples also include the situation where the change in usage conditions of resources of the radio bands used in the ad-hoc communication network is detected.

Note that as to the communication request originating from the communication application unit 21, this communication request may be implemented so as to notify it to a wireless communication device serving as a communication destination or a communication path, in RSVP (Resource Reservation Protocol) standardized by RFC 2205 in the IETF, or signaling protocol similar thereto.

Upon starting the processes, the ad-hoc communication network join state control unit 23 firstly determines whether or not all of the radio units 22 (radio units 22-*a* and 22-*b*) of the wireless communication device itself are in a state where radio waves are not transmitted between them and other wireless communication devices, and thus the radio units are isolated (step S201).

When it is determined at step S201 that all of the radio units 22 are isolated (Yes at step S201), the ad-hoc communication network join state control unit 23 determines that it is not necessary to change the configuration because the wireless communication device itself cannot conduct communication, and thus does not change the configuration (step S211). The ad-hoc communication network join state control unit 23 then terminates the processes.

On the other hand, when it is determined at step S201 that there is a radio unit which is not in the isolated state (No at step S201), the ad-hoc communication network join state control unit 23 determines whether or not there is a radio unit 22 which uses the high frequency band (in this example, the UHF band) to join the ad-hoc communication network (step S202).

If there is a radio unit 22 which uses the high frequency band to join the ad-hoc communication network (Yes at step S202), the ad-hoc communication network join state control unit 23 determines whether or not this radio unit 22 stably conducts wireless communication with other wireless communication devices joining the ad-hoc communication network. In other words, the ad-hoc communication network join state control unit 23 determines whether or not a degree of linkage (degree of connectivity) of this radio unit 22 is low (step S203). The ad-hoc communication network join state control unit 23 determines the degree of linkage based on a state of communication with other wireless communication devices in the ad-hoc communication network which this radio unit 22 joins.

This state of communication is determined based on, for example, factors such as the number of neighboring devices (the number of wireless communication devices with which the intended radio unit 22 can communicate within its joined ad-hoc communication network), the strength of radio waves, the power of noise, error rates of wireless communication, propagation delay and signal-to-noise (SN ratio).

For example, the strength of radio waves can be determined to be "strong" (no problem) if the measured strength of radio waves is equal to or more than a threshold for the strength of radio waves indicating that wireless communication can be normally conducted, and determined to be "weak" (there is a problem) if the measured strength of radio waves is less than the threshold. Each of the power of noise, error rates of wireless communication, propagation delay, SN ratio and the like can also be determined to be "no problem" if it is equal to or more than a threshold indicating that wireless communication can be normally conducted, and determined to be "there is a problem" if it is less than the threshold. These thresholds are values which appropriately vary according to the frequency band or the modulation method. Whether or not to be able to conduct wireless communication with neighboring wireless communication devices can be determined based on the number of factors determined to be "no problem" or "there is a problem" among one or more of these factors.

The number of neighboring devices is determined according to whether or not the number of wireless communication devices with which the intended radio unit 22 can communicate within its joined ad-hoc communication network is equal to or more than a predetermined number (e.g., equal to or more than one).

For example, in a case where there is a wireless communication device which uses the UHF band to join an ad-hoc communication network, when the number of different wireless communication devices with which this wireless communication device can conduct wireless communication within the network is "2" and it is determined that the strength of radio waves is weak in communication with all of the different devices, the ad-hoc communication network join state control unit 23 can determine that the degree of linkage is low. Even when the number of different wireless communication devices with which this wireless communication device can conduct wireless communication within the network is "2" and it is determined that the strength of radio waves is weak in communication with one of the different devices, if it is determined that the strength of radio waves is strong in communication with another device, the ad-hoc communication network join state control unit 23 can determine that the degree of linkage is high. That is, it is determined that the degree of linkage is "high" when there is a wireless communication device from which the strength of radio waves is strong, and it is determined that the degree of linkage is "low" when there is no wireless communication device from which the strength of radio waves is strong. In this way, the ad-hoc communication network join state control unit 23 may determine whether the degree of linkage is high or low, by calculating whether or not the number of neighboring devices is equal to or more than the predetermined value, and how many devices can normally conduct wireless communication among the neighboring devices. Note that the ad-hoc communication network join state control unit 23 may target, for determining the communication state, not only the wireless communication devices within the ad-hoc communication network which the radio unit 22 joins, but also the number of wireless communication devices which are in another ad-hoc communication network and with which the radio unit 22 can communicate, and factors such as the strength of radio waves in wireless communication with these wireless communication devices.

When it is determined at step S203 that the degree of linkage is low (Yes at step S203), the ad-hoc communication network join state control unit 23 determines whether or not switching of the band used by the radio unit 22 to be determined at step S203 (pulling out of the ad-hoc communication network) influences the connectivity of the wireless communication device itself. That is, the ad-hoc communication network join state control unit 23 determines whether or not the wireless communication device itself goes into a state where it is isolated from other wireless communication devices when the frequency band used by the radio unit 22 is switched to the lower one (step S205).

One of examples of the "isolated state" is a case where when the radio unit 22-*a* in the wireless communication device itself conducts wireless communication by using the UHF band and the radio unit 22-*b* does not conduct wireless communication, the band used by the radio unit 22-*a* is switched to the VHF band, so that the radio unit 22-*a* becomes unable to communicate with all other wireless communication devices with which the radio unit 22-*a* has originally conducted wireless communication by using the UHF band. If the band is switched from the UHF band to the VHF band, a distance which radio waves reach becomes longer, and thus the number of wireless communication devices which can conduct communication basically increases. Meanwhile, since there are obstacles or the like, a wireless communication device which cannot conduct wireless communication due to the switch into the VHF band may occur.

When the ad-hoc communication network join state control unit 23 determines at step S205 that the wireless communication device itself will be isolated (No at step S205), the ad-hoc communication network join state control unit 23 gives greater priority to keeping the connection than to stabilizing the connection, and therefore determines that it is not necessary to change the configuration of the radio unit (step S211).

On the other hand, when it is determined at step S205 that the wireless communication device itself will not be isolated (Yes at step S205), the ad-hoc communication network join state control unit 23 determines whether or not the radio unit 22 determined at step S203 can pull out of the ad-hoc communication network which the radio unit 22 is currently joining (step S209).

When it is determined that the radio unit 22 cannot pull out of the ad-hoc communication network which it is currently joining (No at step S209), the ad-hoc communication network join state control unit 23 determines that it is not necessary to change the configuration of the radio unit (step S211).

At step S209, the ad-hoc communication network join state control unit 23 performs the determination as to whether or not the determined radio unit 22 can pull out of the ad-hoc communication network, by determining the presence or absence of other wireless communication devices which may be isolated due to changing the configuration of the radio unit 22. If there is a different wireless communication device which has conducted wireless communication with only the determined radio unit 22, it would appear that since the determined radio unit 22 changes the used band, this wireless communication device goes into an isolated state where it cannot conduct wireless communication with any wireless communication device. In this case, the ad-hoc communication network join state control unit 23 gives greater priority to not having other wireless communication devices isolated than to improving the communication state of the wireless communication device itself, and therefore determines that the radio unit cannot pull out of the ad-hoc communication network which it is currently joining. Thus, the change in configuration of the radio unit is not made (step S211). The details of "other wireless communication devices" are the ones as described above in the first exemplary embodiment.

Further, at step S209, the ad-hoc communication network join state control unit 23 determines whether or not it is possible to pull out of the ad-hoc communication network, based on conditions under which the communication application unit 21 performs the communication data transfer. In a case where the communication application unit 21 is transferring the communication data from the determined radio unit 22 to a different wireless communication device, if the band of the radio unit 22 is immediately changed, it may cause a disadvantage that the communication data is disrupted. In this case, the ad-hoc communication network join state control unit 23 temporarily stops a process to change contents of the configuration of the determined radio unit 22, and after completion of the communication data transmission, executes the process to change contents of the configuration of the radio unit 22.

On the other hand, when it is determined at step S209 that the pulling out can be performed (i.e., when there is no isolated different wireless communication device and the determined radio unit 22 does not transfer the communication data), the ad-hoc communication network join state control unit 23 changes the wireless communication configuration of the determined radio unit 22 (step S210). Specifically, the configuration is changed so as to switch the radio band used by the radio unit 22 from the UHF band to the VHF band. The ad-hoc communication network join state control unit 23 may change the communication method in addition to the radio band.

Hereinafter, the description is continued with reference again to the branches at steps S202 and S203. When at step S202, there is no radio unit 22 which uses the high frequency band to join the ad-hoc communication network (No at step S202), or when it is determined at step S203 that the degree of linkage is high (No at step S203), the ad-hoc communication network join state control unit 23 determines whether or not there is a radio unit which has a shortage of available communication bands (bands not used for communication) in the wireless communication device itself (step S204). The ad-hoc communication network join state control unit 23 performs this determination by inquiring about the amount of available communication bands of each radio unit in the wireless communication device itself. The "shortage of available communication bands" means that the amount of available communication bands is equal to or less than a predetermined value. The details of this are the ones as described in the first exemplary embodiment.

When it is determined that there is a radio unit which has a shortage of available communication bands (Yes at step S204), the ad-hoc communication network join state control unit 23 performs the determination shown at step S205. The aim of this is to increase the amount of available communication bands by switching the frequency band.

For example, assume that there is a radio unit 22 which conducts communication by the VHF band, and it is determined as step S204 that the VHF band has a shortage of available communication bands therein. The amount of available communication bands can be increased by changing the frequency band used by the radio unit 22 to the UHF band whose bandwidth is broader. At this time, the ad-hoc communication network join state control unit 23 performs the determination at step S205 to switch the used radio band from the VHF band to the UHF band, thereby determining whether or not the wireless communication device itself may be isolated. This is because it is assumed that since the distance which radio waves reach in the UHF band is shorter than that in the VHF band, it becomes impossible to conduct communication with wireless communication devices with which the communication has been able to be conducted in the VHF band.

When it is determined that it is not possible to conduct communication with any wireless communication device, i.e., the wireless communication device itself will be isolated (No at step S205), the ad-hoc communication network join state control unit 23 gives greater priority to maintaining the current wireless communication connection, and therefore does not change the configuration (step S211).

When it is determined that the wireless communication device itself will not be isolated (Yes at step S205), the ad-hoc communication network join state control unit 23 determines whether or not the determined radio unit 22 can pull out of the ad-hoc communication network which it is currently joining (step S209). The details of step S209 are the ones as described above. Then, in accordance with a result of the determination at step S209, the ad-hoc communication network join state control unit 23 executes the process show at step S210 or S211.

When it is determined at step S204 that there is no radio unit 22 which has a shortage of available communication bands (No at step S204), the ad-hoc communication network join state control unit 23 determines whether or not any one of the radio units 22 detects an ad-hoc communication network differing from the ad-hoc communication network which it is currently joining (i.e., an ad-hoc communication network which the wireless communication device itself is not currently joining) (step S206).

Specific examples of this above condition are as follows. The examples include a condition under which in the vicinity of the wireless communication device itself, a wireless communication device, which has been powered off and not conducted wireless communication, is powered on and starts the wireless communication. At this time, the radio unit 22 in the wireless communication device itself detects an ad-hoc communication network formed by this wireless communication device. For example, the radio unit 22 may detect the ad-hoc communication network formed by this wireless communication device, by obtaining beacon signals from this wireless communication device, and thereby acquiring information on a destination address of this wireless communication device, and a frequency band and a communication method used for the communication.

In another example, there can be considered a condition under which a wireless communication device, which has been at a distance where it cannot communicate with the wireless communication device itself, moves so as to get close enough to communicate with the wireless communication device itself. In this condition also, the radio unit 22 in the wireless communication device itself detects an ad-hoc communication network formed by this wireless communication device, by e.g., obtaining beacon signals from this wireless communication device.

When the ad-hoc communication network join state control unit 23 detects the ad-hoc communication network differing from the ad-hoc communication network which the radio unit currently joins, the ad-hoc communication network join state control unit 23 determines whether or not it is possible to improve the communication environment, by pulling out of the ad-hoc communication network which the radio unit currently joins and then newly joining the detected ad-hoc communication network (step S207). The "improvement of communication environment" includes for example, at least one of the following matters: it is possible to conduct communication whose speed is higher than that of the current communication, it is possible to conduct communication whose band is broader, it is possible to more stably conduct communication, and the number of wireless communication devices which can conduct communication increases. Alternatively, it may be determined that the communication environment is improved, in a case where one of the following becomes equal to or more than a predetermined value or criterion: the speed of wireless communication, the band of communication, the stability of communication and the number of wireless communication devices which can conduct communication. The stability of communication has been described above in the explanation of step S203.

When it is determined that it is possible to improve the communication environment by newly joining the detected ad-hoc communication network (Yes at step S207), the ad-hoc communication network join state control unit 23 determines whether or not the radio unit 22, which is conducting the wireless communication in the ad-hoc communication network that it is currently joining, can pull out of the ad-hoc communication network that it is currently joining (step S209).

When it is determined the determined radio unit 22 can pull out (Yes at step S209), the ad-hoc communication network join state control unit 23 controls the determined radio unit 22 to change its configuration so as to pull out of the ad-hoc communication network which it is currently joining and to join the newly detected ad-hoc communication network (Yes at step S209). That is, the ad-hoc communication network join state control unit 23 performs control to switch the communication band and the communication method used by the radio unit 22 from ones for the ad-hoc communication network which the radio unit 22 is currently joining to ones for the newly detected ad-hoc communication network.

When it is determined that the determined radio unit 22 cannot pull out (No at step S209), the ad-hoc communication network join state control unit 23 does not change the configuration of the determined radio unit 22 (step S211).

When it is determined that it is not possible to improve the communication environment even upon joining the newly detected ad-hoc communication network (No at step S207), the ad-hoc communication network join state control unit 23 determines that it is not necessary to change the configuration of the radio unit, and thus does not change the used band (step S211).

The description is continued with reference again to the determination at step S206. When it is determined at step S206 that the ad-hoc communication network differing from the ad-hoc communication network which the radio unit is currently joining is not detected (No at step S206), the ad-hoc communication network join state control unit 23 determines whether or not there is a sufficient amount of available communication bands in the ad-hoc communication network which any one of the radio units 22 in the wireless communication device itself joins (step S208). The ad-hoc communication network join state control unit 23 estimates, with respect to all radio units 22, the amount of bands used for wireless communication and the amount of available communication bands, thereby performing the determination at step S208.

The "sufficient amount of available communication bands" means that the amount of available communication bands in the radio band used by one of the radio units 22-*a* and 22-*b* is larger than the amount of communication bands used by another radio unit, by a predetermined value or more. The "amount of communication bands used by one radio unit" includes not only the amount of communication bands currently used by one radio unit, but also the concept of the amount of communication bands which it is expected will be used in the future. Similarly, the "amount of communication bands used by another radio unit" also includes the concept of the amount of communication bands which it is expected will be used in the future. Moreover, the "predetermined value" is a threshold indicating the amount of available communication bands necessary for normally conducting wireless communication in the radio band used by one radio unit. That is, at step S208, the ad-hoc communication network join state control unit 23 determines whether or not it is possible to ensure the amount of available communication bands necessary for normally conducting wireless communication in the radio band used by one radio unit, in a case where one radio unit conducts wireless communication which is to be conducted by another radio unit.

For example, when the radio unit 22-*a* conducts wireless communication by using the VHF band and the radio unit 22-*b* conducts wireless communication by using the UHF band, the ad-hoc communication network join state control unit 23 determines, at step S208, whether or not the wireless communication conducted by the radio unit 22-*a* can be made in the UHF band by which the radio unit 22-*b* conducts the wireless communication. Specifically, the ad-hoc communication network join state control unit 23 determines whether or not the UHF band has the mount of available communication bands which is equal to or more than the predetermined value, even when in the UHF band, the amount of bands for the wireless communication conducted by the radio unit 22-*a* is added to the amount of bands used by the radio unit 22-*b*.

When it is determined that there is no sufficient amount of available communication bands in the ad-hoc communication networks which all radio unit 22 join (No at step S208), the ad-hoc communication network join state control unit 23 determines that it is not necessary to change the configuration of the radio unit, and thus does not change the used band (step S211).

When it is determined that there in a sufficient amount of available communication bands in the ad-hoc communication network which any one of the radio units 22 joins (Yes at step S208), the ad-hoc communication network join state control unit 23 determines whether or not the radio unit 22, which conducts wireless communication in an ad-hoc communication network determined to have an insufficient amount of available communication bands, can pull out of this ad-hoc communication network (step S209). Alternatively, the ad-hoc communication network join state control unit 23 may determine whether or not the radio unit 22, which conducts wireless communication in an ad-hoc communication network determined to have the least amount of available communication bands, can pull out of this ad-hoc communication network.

When it is determined that the radio unit 22 determined at step S209 can pull out of the ad-hoc communication network (Yes at step S209), the determined radio unit 22 pulls out of the ad-hoc communication network, and the configuration thereof is changed so as not to conduct the wireless communication. Moreover, control is performed for the radio unit 22 determined to have a sufficient amount of available communication bands, so that this radio unit further conducts wireless communication which is to be conducted by the radio unit 22 pulling out of the ad-hoc communication network (step S210).

In the above processes, steps S202 to S204 correspond to step S101 shown in FIG. 3. Step S211 corresponds to step S102 shown in FIG. 3. Steps S205 and S209 correspond to step S103 shown in FIG. 3. Step S210 corresponds to step S104 shown in FIG. 3.

The above processes can be executed by, for example, each wireless communication device in the wireless communication system 200 according to FIGS. 4A to 4C, and the wireless communication system 300 according to FIG. 5.

The wireless communication device according to the second exemplary embodiment achieves the following advantageous effects.

First, it is possible by the processes at steps S204, S205 and S209 to control the configuration of one of a plurality of radio units included in the wireless communication device so as to ensure that the amount of communication bands necessary for information transmission is as large as possible, without reducing the number of wireless communication devices which can conduct communication. This is because the wireless communication device executes the following processes.

(1) When it is determined that the amount of available communication bands becomes insufficient and that no isolated wireless communication device occurs even if the radio band is changed, the wireless communication device uses, for the wireless communication, the second radio band (UHF band) which has a broader band than the first radio band (VHF band). The reason for this is to ensure the amount of communication bands for information transmission.

(2) Even when the amount of available communication bands becomes insufficient, if the wireless communication device itself or another wireless communication device is isolated due to changing the used radio band to the second radio band which has a shorter reachable distance, the used radio band is not changed. The reason for this is to make the wireless communication device remain in the state where it can conduct communication.

For example, in a case where broad-band communication is conducted, it is possible to ensure the amount of communication bands for a communication application to transmit information. Moreover, in a case where the band is changed from the VHF band to the UHF band, it is possible to prevent wireless communication devices from becoming unable to conduct communication. Therefore, it is possible to ensure the amount of communication bands for information transmission without reducing the number of wireless communication devices which can conduct communication.

Furthermore, when it is determined that wireless communication with other wireless communication devices is not stable and that no isolated wireless communication device occurs even if the radio band is changed, the wireless communication device uses, for the wireless communication, the first radio band (VHF band) which has a longer reachable distance of radio waves than the second radio band (UHF band). Thus, it is possible to stabilize the wireless communication. In a case where an isolated wireless communication device occurs due to the change from the second radio band to the first radio band, the used radio band is not changed, so that it is possible to make the wireless communication device remain in the state where it can conduct communication.

Second, the wireless communication device can use the change in the communication environment thereof as a trigger to autonomously perform the determination as to whether the wireless communication device joins or pulls out of the ad-hoc communication network. The change in the communication environment includes, for example, at least one of the following changes: the change in the strength of radio waves which the wireless communication device receives from other wireless communication devices, the change in the configuration of wireless communication network, reception of communication requests originating from other wireless communication devices, and the change in usage conditions of resources in the ad-hoc communication network. Thus, a user does not need to determine whether to join or pull out of the ad-hoc communication network.

Third, when there is a radio unit using a high frequency band for wireless communication and this wireless communication is unstable, the wireless communication is conducted in a low frequency band, so that the radio unit can stably connect to other wireless communication devices. This is an advantageous effect achieved by switching, in the processes at steps S202, S203 and S205, the used frequency band to the low frequency band having a longer reachable distance. Moreover, if the wireless communication device itself is isolated due to the switching, the frequency band is not switched, so that it is possible to keep the connectivity of the wireless communication device itself.

Fourth, according to the processes at steps S206 and S207, the wireless communication device is controlled so as to join an ad-hoc communication network which the wireless communication device has not yet joined, but in which it is expected that the communication environment will be improved if the wireless communication device joins it. Thus, it is possible to realize the improvement of the communication environment of the wireless communication device.

Fifth, according to the process at step S208, wireless communication to be conducted by one radio unit is conducted by another radio unit having a sufficient amount of available communication bands, so that it is possible to keep the one radio unit unused. Thus, when sudden communication occurs and thus a new ad-hoc communication network is formed, it is possible to make the one radio unit immediately join this ad-hoc communication network. That is, it is possible to be compatible with the new ad-hoc communication network.

Sixth, when the wireless communication device is controlled so as to switch the used band or pull out of the ad-hoc communication network, the switching of the radio band is not performed if the radio unit switching the radio band is in data communication. Thus, it is possible to reliably transmit the date currently being transmitted.

In the above examples, the ad-hoc communication network join state control unit 23 executes both the determination process and the control process for the radio unit. Meanwhile, the ad-hoc communication network join state control unit 23 may be divided into a determination unit executing the determination process (which corresponds to the determination unit 12 in the first exemplary embodiment), and a control unit executing the control process for the radio unit (which corresponds to the communication control unit 13 in the first exemplary embodiment).

Third Exemplary Embodiment

Figure 8:
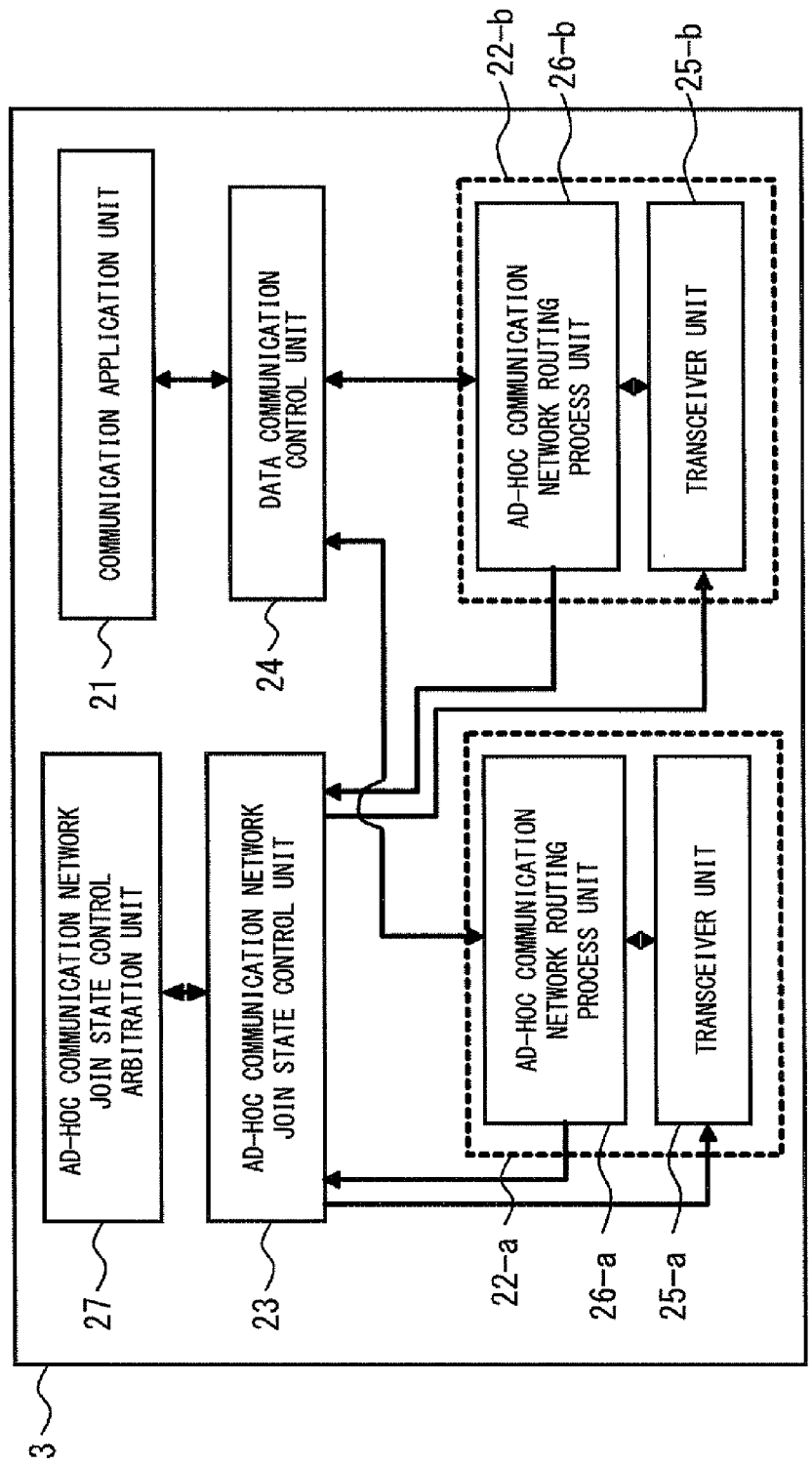
FIG. 8 is a block diagram showing a configuration example of a wireless communication device according to a third exemplary embodiment.

Hereinafter, a third exemplary embodiment of the present invention will be described with reference to the accompany drawings. FIG. 8 is a block diagram showing a configuration example of a wireless communication device according to the third exemplary embodiment. Compared with the wireless communication device 2, a wireless communication device 3 newly includes an ad-hoc communication network join state control arbitration unit (arbitration unit) 27.

The ad-hoc communication network join state control arbitration unit 27 communicates, to other wireless communication devices through any one of the radio units, the determination result obtained by the ad-hoc communication network join state control unit 23 in the wireless communication device itself, and arbitrates, between the device itself and other wireless communication devices, whether to join a new network or pull out of a network which they are currently joining.

Other elements of the wireless communication device 3 are the same as those of the wireless communication device 2.

Figure 9A:
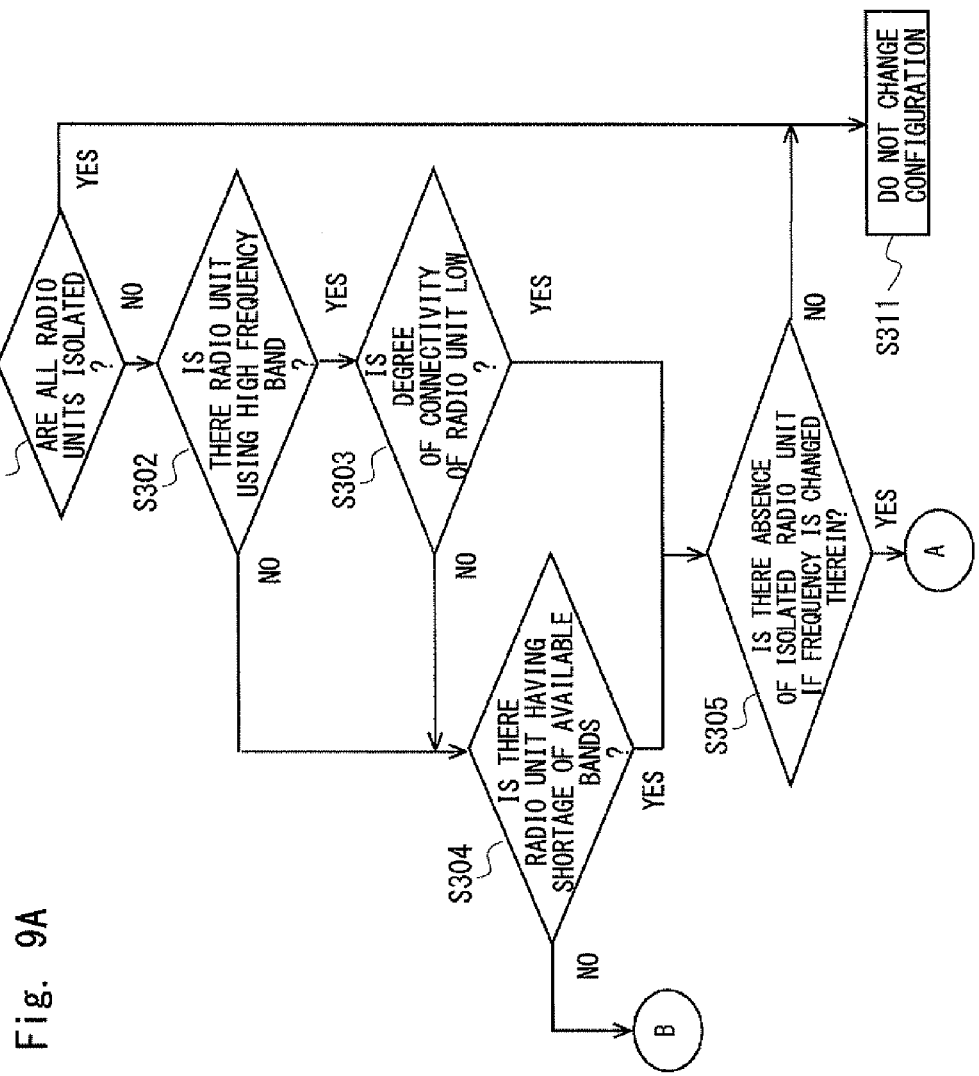
FIG. 9A is a first flow chart showing an example of processes executed by an ad-hoc communication network join state control unit and an ad-hoc communication network join state control arbitration unit according to the third exemplary embodiment.
Figure 9B:
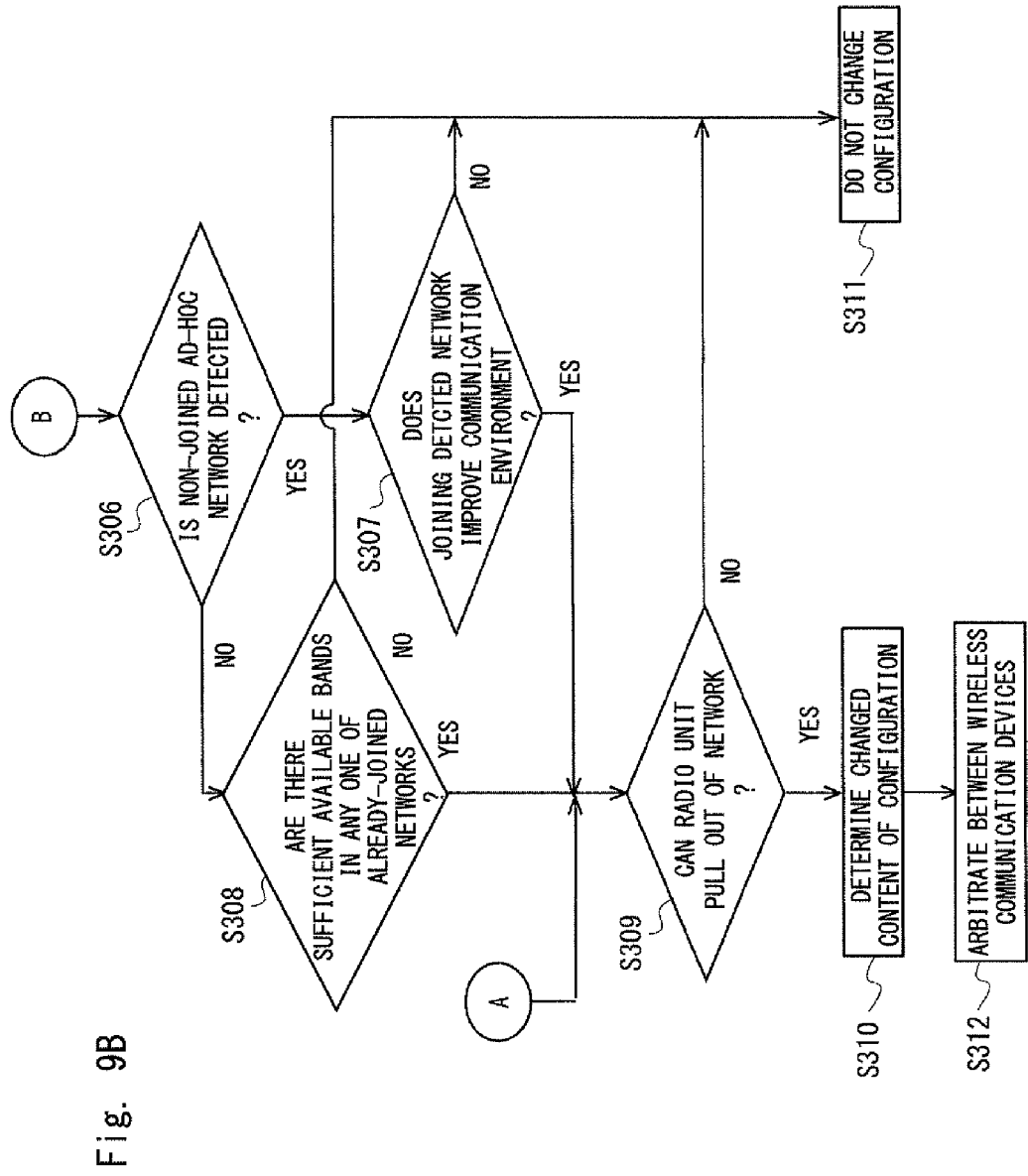
FIG. 9B is a second flow chart showing an example of processes executed by the ad-hoc communication network join state control unit and the ad-hoc communication network join state control arbitration unit according to the third exemplary embodiment.

Next, with reference to FIGS. 9A and 9B, there will be described a flow of processes in the ad-hoc communication network join state control unit 23 of the wireless communication device 3 according to the third exemplary embodiment. FIGS. 9A and 9B are flow charts showing examples of processes executed by the ad-hoc communication network join state control unit 23 and the ad-hoc communication network join state control arbitration unit 27 according to the third exemplary embodiment.

Steps S301 to S309 shown in FIGS. 9A and 9B are the same as steps S201 to S209 shown in FIGS. 7A and 7B.

The ad-hoc communication network join state control unit 23 determines at step S309 that the radio unit can pull out of the network, and then determines changed contents of the configuration (step S310). At this stage, the ad-hoc communication network join state control unit 23 has not yet changed the configuration of the radio unit 22.

After that, the ad-hoc communication network join state control arbitration unit 27 uses the determination by the ad-hoc communication network join state control unit 23 of the changed contents of the configuration, as a trigger to arbitrate whether to join or pull out of an ad-hoc communication network between the radio unit 22 whose configuration will be changed and other wireless communication devices joining the ad-hoc network which the radio unit 22 joins (step S312).

Figure 10:
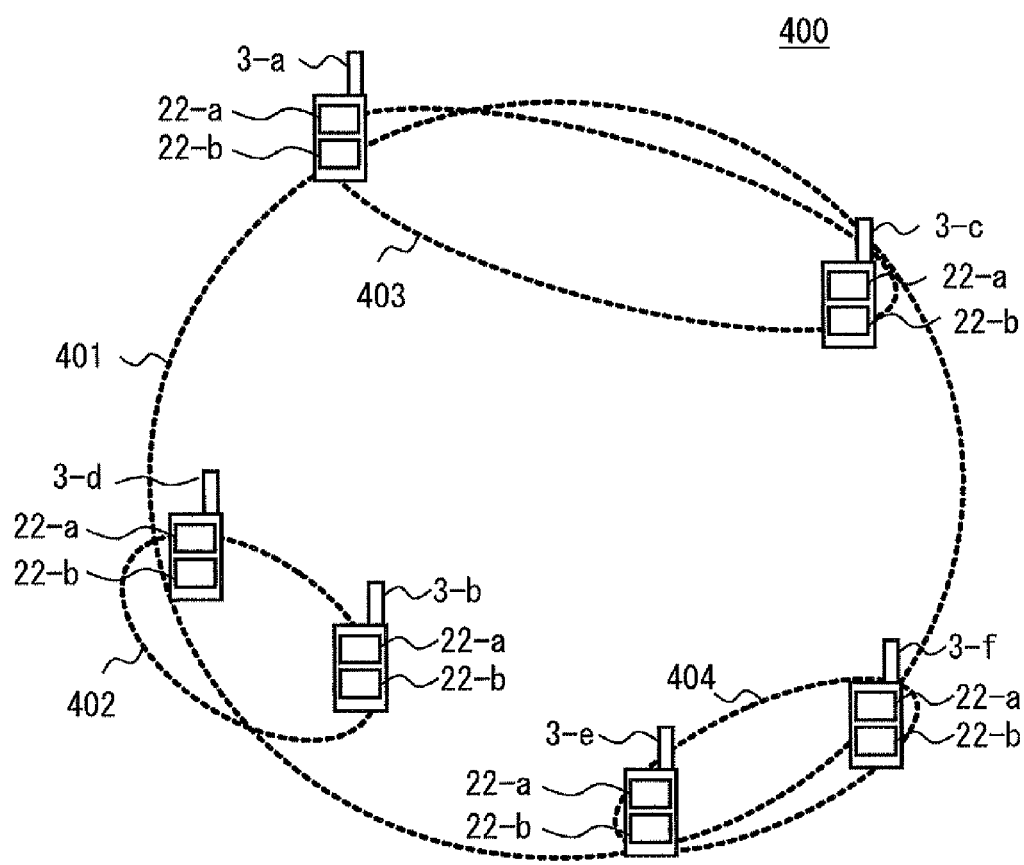
FIG. 10 is a diagram showing an example of a wireless communication system according to the third exemplary embodiment.

This arbitration is performed as follows, for example. FIG. 10 shows a wireless communication system 400, in which a state similar to FIG. 4B is illustrated. Each of wireless communication devices shown in FIG. 10 includes the elements shown in FIG. 8.

In FIG. 10, the ad-hoc communication network join state control unit 23 in a wireless communication device 3-*d* determines changed contents of the configuration so as to change the band used by the radio unit 22-*a* to the UHF band. At this time, the ad-hoc communication network join state control arbitration unit 27 in the wireless communication device 3-*d* inquires, by wireless communication through the radio unit 22-*a*, of a wireless communication device 3-*e* about whether or not the change of the used radio band from the VHF band to the UHF band is acceptable.

The ad-hoc communication network join state control arbitration unit 27 in the wireless communication device 3-*e* acquires this inquiry from the radio unit 22-*a* in the device 3-*e* itself, and uses this acquisition as a trigger to determine whether or not the radio band used by the wireless communication device itself can be changed from the VHF band to the UHF band. Specifically, the arbitration unit 27 performs the determination shown at step S209 in FIG. 7B.

If the used radio band can be changed from the VHF band to the UHF band, the ad-hoc communication network join state control arbitration unit 27 in the wireless communication device 3-*e* transmits, to the wireless communication device 3-*d* through the radio unit 22-*a*, information indicating that the used radio band can be changed from the VHF band to the UHF band. The ad-hoc communication network join state control unit 23 in the wireless communication device 3-*d* changes the configuration of the radio unit 22-*a* in the device 3-*d* itself, based on the received information. Moreover, the ad-hoc communication network join state control unit 23 in the wireless communication device 3-*e* also changes the configuration of the radio unit 22-*a* in the device 3-*e* itself.

If the used radio band cannot be changed from the VHF band to the UHF band, the ad-hoc communication network join state control arbitration unit 27 in the wireless communication device 3-*e* transmits, to the wireless communication device 3-*d* through the radio unit 22-*a*, information indicating that the used radio band cannot be changed from the VHF band to the UHF band. The ad-hoc communication network join state control unit 23 in the wireless communication device 3-*d* does not perform (stops the execution of) the change of the configuration of the radio unit 22-*a* in the device 3-*d* itself, based on the received information. Note that in a case where the wireless communication device 3-*e* cannot change the radio band due to temporary reasons, the wireless communication device 3-*e* may inform about time required to become able to change the radio band, and after the time expires, the ad-hoc communication network join state control unit 23 in the wireless communication device 3-*d* may change the configuration of the radio unit 22-*a* in the device 3-*d* itself. After the time expires, the ad-hoc communication network join state control unit 23 in the wireless communication device 3-*e* also changes the configuration of the radio unit 22-*a* in the device 3-*e* itself.

In this way, when the ad-hoc communication network join state control unit 23 performs control to switch the wireless communication configuration used by the wireless communication unit, or controls the wireless communication unit so as to pull out of the ad-hoc communication network and join another ad-hoc communication network, the ad-hoc communication network join state control arbitration unit 27 arbitrates, for other wireless communication devices, whether or not to perform such control. According to the above processes, the wireless communication device according the third exemplary embodiment co-operates with other wireless communication devices joining the same ad-hoc communication network to determine whether to join or pull out of the ad-hoc communication network, and to perform the joining or the pulling out. Thus, it is possible to more quickly form an ad-hoc communication network in which the amount of communication bands can be ensured, without reducing the number of wireless communication devices which can conduct communication.

In the above example, although the arbitration control is performed for one wireless communication device, the arbitration control may be similarly performed for a plurality of wireless communication devices.

That is, the above description has been made taking as the example, the patter where when the broad-band communication is directly conducted between two wireless communication devices (without being relayed through another wireless communication device), the arbitration control is performed between the wireless communication device 3-*d* starting the broad-band communication and the wireless communication device 3-*e* serving as a destination of the broad-band communication. Meanwhile, in a case where another wireless communication device relays broad-band communication data, the arbitration control may be performed not only between the source wireless communication device and the destination wireless communication device, but also between them and the device relaying the communication data. The wireless communication devices 3-*d* and 3-*e* may perform the arbitration control for other wireless communication devices (e.g., all wireless communication devices joining the ad-hoc communication network which the wireless communication device 3-*d* joins and the ad-hoc communication network which the wireless communication device 3-*e* joins).

Furthermore, the ad-hoc communication network join state control arbitration unit 27 may transmit information on the arbitration to only one or a part of specific wireless communication devices forming the ad-hoc communication network. The one or some of specific wireless communication devices are devices serving as the so-called super node, and they acquire information on the arbitration from other wireless communication devices, and control switching of bands in other wireless communication devices based on the current intra-network routing information and inter-network routing information.

Note that the present invention is not limited to the above-mentioned exemplary embodiments, and can be modified as appropriate in the range not departing from the gist of the present invention. For example, aspects of the present invention can include not only a wireless communication device, but also a wireless communication system including the wireless communication device described in any one of the first to third exemplary embodiments. Moreover, other aspects of the present invention can include processing methods for the wireless communication device, which have been described in FIGS. 3, 7A to 7B, and 9A to 9B. The present invention can be applied to a wireless communication device forming an ad-hoc network, a wireless communication system, and a wireless communication method.

The order of executing the steps in the flow charts shown in FIGS. 7A and 7B can be appropriately interchanged, and thus is not fixed to the one shown in FIGS. 7A and 7B. For example, the determination process at step S205 may be performed between the determination processes at steps S201 and S202. Steps S206 to S208 may also be performed between the determination processes at steps S201 and S202. The order of executing the steps in the flow charts shown in FIGS. 9A and 9B can be similarly interchanged. As another alternative, the order of executing the steps may be interchanged as described in the first exemplary embodiment.

The wireless communication devices, which conduct the wireless communication by the ad-hoc network, may not be the same types of wireless communication devices. For example, in a case where wireless communication is conducted by a wireless LAN, the wireless communication may be conducted between different types of wireless communication devices such as a personal computer and a handheld terminal.

The process flows illustrated in the first to third exemplary embodiments can be executed as one of control methods by the wireless communication device. For example, the process flow may be executed as a display control program by the wireless communication device.

The display control program executed by the wireless communication device can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The control program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Hereinafter, various embodiments of the present invention will be supplementary noted.

(Supplementary Note 1)

A wireless communication device that holds a plurality of wireless communication units separately forming ad-hoc wireless communication networks together with different wireless communication devices, and that conducts wireless communication across the plural ad-hoc wireless communication networks, the wireless communication device comprising:

first and second wireless communication units that each forms an ad-hoc wireless communication network together with the different wireless communication devices to conduct wireless communication, by switching one of a first wireless communication configuration and a second wireless communication configuration that differs from the first wireless communication configuration in communication characteristics to another to be used;

a determination unit that determines, at least when the first or second wireless communication unit uses the first wireless communication configuration for conducting wireless communication, whether or not there is a wireless communication device that becomes unable to conduct wireless communication due to changing the first wireless communication configuration to the second wireless communication configuration, among the wireless communication device itself and the different wireless communication devices; and a communication control unit that performs, when the determination unit determines that there is no wireless communication device that becomes unable to conduct wireless communication and in a case where it is necessary to change the first wireless communication configuration, control to switch a wireless communication configuration of a wireless communication unit that uses the first wireless communication configuration to the second wireless communication configuration, and that performs, when the determination unit determines that there is a wireless communication device that becomes unable to conduct wireless communication, control to leave the wireless communication configuration used by the wireless communication unit as the first wireless communication configuration.

(Supplementary Note 2)

The wireless communication device according to Supplementary note 1, wherein the first wireless communication configuration differs from the second wireless communication configuration, in at least one of a frequency band, a modulation method and parameters corresponding thereto, an access method and parameters corresponding thereto, a frame configuration, and radio waves transmission output.

(Supplementary Note 3)

The wireless communication device according to Supplementary note 1 or 2, wherein the case where it is necessary to change the first wireless communication configuration includes a case where the amount of available communication bands in an ad-hoc wireless communication network formed by using the first wireless communication configuration is equal to or less than a predetermined value.

(Supplementary Note 4)

The wireless communication device according to any one of Supplementary notes 1 to 3, wherein the case where it is necessary to change the first wireless communication configuration includes a case where wireless communication with the different wireless communication devices is not stable.

(Supplementary Note 5)

The wireless communication device according to any one of Supplementary notes 1 to 4, wherein the determination unit uses, as a trigger to perform the determination, change in a communication environment of the wireless communication device itself.

(Supplementary Note 6)

The wireless communication device according to Supplementary note 4, wherein the change in the communication environment includes at least one of change in the strength of radio wave which the wireless communication device itself receives from the different wireless communication devices, change in connection relationships between the wireless communication devices in the ad-hoc wireless communication network, and reception of communication requests originating from the different wireless communication devices.

(Supplementary Note 7)

The wireless communication device according to any one of Supplementary notes 1 to 6, wherein when the determination unit detects another ad-hoc wireless communication network differing from the ad-hoc wireless communication network in which the first or second wireless communication unit uses the first wireless communication configuration for conducting the wireless communication, the determination unit further determines whether or not joining said another ad-hoc wireless communication network improves a communication environment with the different wireless communication devices, compared to the ad-hoc wireless communication network, and wherein when it is determined by the determination unit that the communication environment is improved, the communication control unit controls the wireless communication unit so as to pull out of the ad-hoc wireless communication network and to join said another ad-hoc wireless communication network.

(Supplementary Note 8)

The wireless communication device according to Supplementary note 7, further comprising:

an arbitration unit that arbitrates, when the communication control unit controls the wireless communication unit so as to pull out of the ad-hoc wireless communication network and to join said another ad-hoc wireless communication network, whether or not to perform the control for the different wireless communication devices.

(Supplementary Note 9)

A wireless communication system comprising a wireless communication device according to any one of Supplementary notes 1 to 8.

(Supplementary Note 10)

A wireless communication method for a wireless communication device that holds a plurality of wireless communication units separately forming ad-hoc wireless communication networks together with different wireless communication devices, and that conducts wireless communication across the plural ad-hoc wireless communication networks, the method comprising:

determining, when at least a first wireless communication unit or a second wireless communication unit uses a first wireless communication configuration for conducting wireless communication, whether or not there is a wireless communication device that becomes unable to conduct wireless communication due to changing the first wireless communication configuration to a second wireless communication configuration that differs from the first wireless communication configuration in communication characteristics, among the wireless communication device itself and the different wireless communication devices;

performing, when it is determined that there is no wireless communication device that becomes unable to conduct wireless communication and in a case where it is necessary to change the first wireless communication configuration, control to switch a wireless communication configuration of the wireless communication unit that uses the first wireless communication configuration to the second wireless communication configuration; and performing, when it is determined that there is a wireless communication device that becomes unable to conduct wireless communication, control to leave the wireless communication configuration of the wireless communication unit that uses the first wireless communication configuration as the first wireless communication configuration.

(Supplementary Note 11)

The wireless communication device according to any one of Supplementary notes 1 to 8, further comprising:

an arbitration unit that arbitrates, when the communication control unit performs control to switch the wireless communication configuration of the wireless communication unit using the first wireless communication configuration to the second wireless communication configuration, whether or not to perform the control for the different wireless communication devices.

(Supplementary Note 12)

The wireless communication device according to Supplementary note 7, wherein when the communication control unit controls the wireless communication unit so as to pull out of the ad-hoc wireless communication network and to join said another ad-hoc wireless communication network, the determination unit determines whether or not the wireless communication unit is transmitting data, and wherein when it is determined by the determination unit that the wireless communication unit is transmitting the data, the communication control unit stops performing the control.

(Supplementary Note 13)

The wireless communication device according to any one of Supplementary notes 1 to 8, wherein when the communication control unit performs control to switch the wireless communication configuration of the wireless communication unit using the first wireless communication configuration to the second wireless communication configuration, the determination unit determines whether or not the wireless communication unit is transmitting data, and wherein when it is determined by the determination unit that the wireless communication unit is transmitting the data, the communication control unit stops performing the control.

(Supplementary Note 14)

The wireless communication device according to any one of Supplementary notes 1 to 8, wherein the first wireless communication configuration is a configuration for conducting wireless communication by a VHF band, and the second wireless communication configuration is a configuration for conducting wireless communication by a UHF band.

(Supplementary Note 15)

The wireless communication device according to any one of Supplementary notes 1 to 8, wherein the wireless communication device itself and the different wireless communication devices comprise transceivers.

(Supplementary Note 16)

A non-transitory computer readable medium storing a wireless communication program for a wireless communication device that holds a plurality of wireless communication units separately forming ad-hoc wireless communication networks together with different wireless communication devices, and that conducts wireless communication across the plural ad-hoc wireless communication networks, the program causing the wireless communication device to execute:

determining, when at least a first wireless communication unit or a second wireless communication unit uses a first wireless communication configuration for conducting wireless communication, whether or not there is a wireless communication device that becomes unable to conduct wireless communication due to changing the first wireless communication configuration to a second wireless communication configuration that differs from the first wireless communication configuration in communication characteristics, among the wireless communication device itself and the different wireless communication devices;

performing, when it is determined that there is no wireless communication device that becomes unable to conduct wireless communication and in a case where it is necessary to change the first wireless communication configuration, control to switch a wireless communication configuration of the wireless communication unit that uses the first wireless communication configuration to the second wireless communication configuration; and performing, when it is determined that there is a wireless communication device that becomes unable to conduct wireless communication, control to leave the wireless communication configuration of the wireless communication unit that uses the first wireless communication configuration as the first wireless communication configuration.

Hereinbefore, although the present invention has been described, the present invention is not limited to the above description. It will be understood by those of ordinary skill in the art that various changes in form and details may be made therein within the scope of the present invention.

This application is based upon and claims the benefit of priority from Japanese patent application No. 2012-077786, filed on Mar. 29, 2012, the disclosure of which is incorporated herein in its entirety by reference.

INDUSTRIAL APPLICABILITY

The present invention can be applied to a wireless communication device and a wireless communication system, for the purpose of ensuring the amount of communication bands for information transmission without reducing the number of wireless communication devices capable of conducting communication.

REFERENCE SIGNS LIST

1 WIRELESS COMMUNICATION DEVICE
11 WIRELESS COMMUNICATION UNIT
12 DETERMINATION UNIT
13 COMMUNICATION CONTROL UNIT
2 WIRELESS COMMUNICATION DEVICE
21 COMMUNICATION APPLICATION UNIT
22 RADIO UNIT
23 AD-HOC COMMUNICATION NETWORK JOIN STATE CONTROL UNIT
24 DATA COMMUNICATION CONTROL UNIT
25 TRANSCEIVER UNIT
26 AD-HOC COMMUNICATION NETWORK ROUTING PROCESS UNIT
27 AD-HOC COMMUNICATION NETWORK JOIN STATE CONTROL ARBITRATION UNIT
100, 200, 300, 400 WIRELESS COMMUNICATION SYSTEM
101, 102, 103, 201, 202, 203, 204, 205, 206, 301, 302, 401, 402, 403,
404 AD-HOC COMMUNICATION NETWORK

The invention claimed is:

1. A wireless communication device that is configured to conduct wireless communication in both of a first wireless communication configuration and a second wireless communication configuration that differs from the first wireless communication configuration in communication characteristics, the wireless communication device comprising:
   a memory storing a software component;
   at least one processor configured to execute the software component in order to perform:
   switching, when the first wireless communication configuration is being used by the wireless communication device, the first wireless communication configuration to the second wireless communication configuration and switching, when the second wireless communication configuration is being used by the wireless communication device, the second wireless communication configuration to the first wireless communication configuration;
   forming an ad hoc wireless communication network together with different wireless communication devices;
   determining, at least when forming the ad hoc wireless communication network, whether or not there is a wireless communication device that becomes unable to conduct wireless communication due to changing the first wireless communication configuration to the second wireless communication configuration, from among the wireless communication device itself and the different wireless communication devices;
   controlling, when there is no wireless communication device that becomes unable to conduct wireless communication and it is necessary to change the first wireless communication configuration, to switch from the first wireless communication configuration to the second wireless communication configuration; and
   controlling, when there is a wireless communication device that becomes unable to conduct wireless communication, to leave in use the one of the first and second wireless communication configuration being used.

2. The wireless communication device according to claim 1, wherein the first wireless communication configuration differs from the second wireless communication configuration, in at least one of a frequency band, a modulation method and parameters corresponding thereto, an access method and parameters corresponding thereto, a frame configuration, and radio waves transmission output.

3. The wireless communication device according to claim 2, wherein the case where it is necessary to change the first wireless communication configuration includes a case where the amount of available communication bands in an ad-hoc wireless communication network formed by using the first wireless communication configuration is equal to or less than a predetermined value.

4. The wireless communication device according to claim 2, wherein the case where it is necessary to change the first wireless communication configuration includes a case where wireless communication with the different wireless communication devices is not stable.

5. The wireless communication device according to claim 1, wherein the case where it is necessary to change the first wireless communication configuration includes a case where the amount of available communication bands in an ad-hoc wireless communication network formed by using the first wireless communication configuration is equal to or less than a predetermined value.

6. The wireless communication device according to claim 2, wherein the at least one processor is further configured to execute the software component to use, as a trigger to perform the determination, a change in a communication environment of the wireless communication device itself.

7. The wireless communication device according to claim 2,
wherein the at least one processor is further configured to execute the software component to perform:
detecting another ad-hoc wireless communication network differing from the ad-hoc wireless communication network using the first wireless communication configuration for conducting the wireless communication,
determining whether or not joining said another ad-hoc wireless communication network improves a communication environment with the different wireless communication devices, compared to the ad-hoc wireless communication network, and
wherein when it is determined that the communication environment is improved, pulling out of the ad-hoc wireless communication network and joining said another ad-hoc wireless communication network.

8. The wireless communication device according to claim 5, wherein the case where it is necessary to change the first wireless communication configuration includes a case where wireless communication with the different wireless communication devices is not stable.

9. The wireless communication device according to claim 5, wherein the at least one processor is further configured to execute the software component to use, as a trigger to perform the determination, a change in a communication environment of the wireless communication device itself.

10. The wireless communication device according to claim 5,
wherein the at least one processor is further configured to execute the software component to perform:
detecting another ad-hoc wireless communication network differing from the ad-hoc wireless communication network using the first wireless communication configuration for conducting the wireless communication,
determining whether or not joining said another ad-hoc wireless communication network improves a communication environment with the different wireless communication devices, compared to the ad-hoc wireless communication network, and
wherein when it is determined that the communication environment is improved, pulling out of the ad-hoc wireless communication network and joining said another ad-hoc wireless communication network.

11. The wireless communication device according to claim 1, wherein the case where it is necessary to change the first wireless communication configuration includes a case where wireless communication with the different wireless communication devices is not stable.

12. The wireless communication device according to claim 11, wherein the at least one processor is further configured to execute the software component to use, as a trigger to perform the determination, a change in a communication environment of the wireless communication device itself.

13. The wireless communication device according to claim 11,
wherein the at least one processor is further configured to execute the software component to perform:
detecting another ad-hoc wireless communication network differing from the ad-hoc wireless communication network using the first wireless communication configuration for conducting the wireless communication,
determining whether or not joining said another ad-hoc wireless communication network improves a communication environment with the different wireless communication devices, compared to the ad-hoc wireless communication network, and
wherein when it is determined that the communication environment is improved, pulling out of the ad-hoc wireless communication network and joining said another ad-hoc wireless communication network.

14. The wireless communication device according to claim 1, wherein the at least one processor is further configured to execute the software component to use, as a trigger to perform the determination, a change in a communication environment of the wireless communication device itself.

15. The wireless communication device according to claim 14, wherein the change in the communication environment includes at least one of a change in the strength of radio waves which the wireless communication device itself receives from the different wireless communication devices, a change in connection relationships between the wireless communication devices in the ad-hoc wireless communication network, and reception of communication requests originating from the different wireless communication devices.

16. The wireless communication device according to claim 1,
wherein the at least one processor is further configured to execute the software component to perform:
detecting another ad-hoc wireless communication network differing from the ad-hoc wireless communication network using the first wireless communication configuration for conducting the wireless communication,
determining whether or not joining said another ad-hoc wireless communication network improves a communication environment with the different wireless communication devices, compared to the ad-hoc wireless communication network, and
wherein when it is determined that the communication environment is improved, pulling out of the ad-hoc wireless communication network and joining said another ad-hoc wireless communication network.

17. The wireless communication device according to claim 16,
wherein the at least one processor is further configured to execute the software component to perform:
arbitrating, when pulling out of the ad-hoc wireless communication network and joining said another ad-hoc wireless communication network, whether or not to perform the control for the different wireless communication devices.

18. A wireless communication system comprising a wireless communication device according to claim 1.

19. The wireless communication device according to claim 1, wherein the case where there is a wireless communication device that becomes unable to conduct wireless communication is a case where the wireless communication device itself goes into a state where it is isolated from the different wireless communication devices or one of the different wireless communication devices goes into a state where it is isolated from the different wireless communication devices other than said one of the different wireless communication devices.

20. A wireless communication method for a wireless communication device that is configured to conduct wireless communication in both of a first wireless communication configuration and a second wireless communication configuration that differs from the first wireless communication configuration in communication characteristics, the method being carried out by the wireless communication device and comprising:

switching, when the first wireless communication configuration is being used by the wireless communication device, the first wireless communication configuration to the second wireless communication configuration, and switching, when the second wireless communication configuration is being by the wireless communication device, from the second wireless communication configuration to the first wireless communication configuration;

forming an ad hoc wireless communication network together different wireless communication devices;

determining, at least when forming the ad hoc wireless communication network, whether or not there is a wireless communication device that becomes unable to conduct wireless communication due to changing the first wireless communication configuration to a second wireless communication configuration, from among the wireless communication device itself and the different wireless communication devices;

controlling, when there is no wireless communication device that becomes unable to conduct wireless communication and it is necessary to change the first wireless communication configuration, to switch the first wireless communication configuration to the second wireless communication configuration; and controlling, when there is a wireless communication device that becomes unable to conduct wireless communication, to leave in use the one of the first and second wireless communication configuration being used.

* * * * *